(12) United States Patent
Korth et al.

(10) Patent No.: US 7,705,076 B2
(45) Date of Patent: Apr. 27, 2010

(54) RUBBER MIXTURES

(75) Inventors: Karsten Korth, Grenzach-Wyhlen (DE); Andre Hasse, Linnich-Ederen (DE); Dirk Laur, Hausen (DE); Ingo Kiefer, Schwörstadt-Dossenbach (DE); Oliver Klockmann, Niederzier (DE); Philipp Albert, Lörrach (DE); Manuel Friedel, Zürich (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 12/308,047

(22) PCT Filed: May 10, 2007

(86) PCT No.: PCT/EP2007/054547

§ 371 (c)(1),
(2), (4) Date: Mar. 31, 2009

(87) PCT Pub. No.: WO2007/141109

PCT Pub. Date: Dec. 13, 2007

(65) Prior Publication Data

US 2009/0312476 A1    Dec. 17, 2009

(30) Foreign Application Priority Data

Jun. 9, 2006 (DE) .................. 10 2006 027 235

(51) Int. Cl.
C08K 5/54 (2006.01)
(52) U.S. Cl. .................................. 524/263; 524/262
(58) Field of Classification Search .................. 524/263
See application file for complete search history.

(56) References Cited

U.S. PATENT DOCUMENTS

| | | |
|---|---|---|
| 3,350,345 A | 10/1967 | Vanderbilt |
| 3,590,065 A | 6/1971 | Rakus |
| 3,842,111 A | 10/1974 | Meyer-Simon |
| 3,873,489 A | 3/1975 | Thurn |
| 3,978,103 A | 8/1976 | Thurn |
| 3,997,356 A | 12/1976 | Thurn |
| 4,048,206 A | 9/1977 | Voronkov |
| 4,076,550 A | 2/1978 | Thurn |
| 4,153,063 A | 5/1979 | Roselius |
| 4,278,587 A | 7/1981 | Wolff |
| 4,456,718 A | 6/1984 | Brinkmann |
| 4,514,231 A | 4/1985 | Kerner |
| 4,551,541 A | 11/1985 | Hanisch |
| 4,629,775 A | 12/1986 | Arai et al. |
| 4,654,368 A | 3/1987 | Sakamoto et al. |
| 4,798,878 A | 1/1989 | Brinkmann |
| 5,107,009 A | 4/1992 | Rauleder |
| 5,637,209 A | 6/1997 | Wright |
| 5,736,484 A | 4/1998 | Polanek |
| 5,780,538 A | 7/1998 | Cohen |
| 5,840,952 A | 11/1998 | Kudo |
| 5,859,275 A | 1/1999 | Munzenberg |
| 5,914,364 A | 6/1999 | Cohen |
| 5,977,225 A | 11/1999 | Scholl |
| 6,133,466 A | 10/2000 | Edelmann |
| 6,140,393 A | 10/2000 | Bomal |
| 6,331,605 B1 | 12/2001 | Lunginsland |
| 6,362,253 B1 | 3/2002 | Durel |
| 6,403,228 B1 | 6/2002 | Mack |
| 6,433,206 B1 | 8/2002 | Gedon |
| 6,465,544 B1 | 10/2002 | Bomal |
| 6,465,672 B2 | 10/2002 | Michel et al. |
| 6,518,335 B2 | 2/2003 | Reedy |
| 6,548,594 B2 | 4/2003 | Luginsland |
| 6,680,398 B1 | 1/2004 | Boswell et al. |
| 6,849,754 B2 | 2/2005 | Deschler |
| 6,893,495 B2 | 5/2005 | Korth |
| 6,995,280 B2 | 2/2006 | Korth |
| 7,019,160 B2 | 3/2006 | Korth |
| 7,186,768 B2 | 3/2007 | Korth |
| 7,332,619 B2 | 2/2008 | Korth |
| 7,339,067 B2 | 3/2008 | Korth |
| 7,384,997 B2 | 6/2008 | Hasse |
| 7,423,165 B2 | 9/2008 | Korth |
| 7,462,221 B2 | 12/2008 | Korth |
| 7,501,534 B2 | 3/2009 | Korth |
| 2001/0051684 A1 * | 12/2001 | Luginsland et al. ......... 524/492 |
| 2003/0083516 A1 | 5/2003 | Korth |
| 2003/0130535 A1 | 7/2003 | Deschler |
| 2003/0200900 A1 | 10/2003 | Korth |
| 2004/0266968 A1 | 12/2004 | Korth |
| 2005/0124740 A1 | 6/2005 | Klockmann |
| 2005/0124821 A1 | 6/2005 | Korth |
| 2005/0124822 A1 | 6/2005 | Korth |
| 2005/0223946 A1 | 10/2005 | Korth |
| 2006/0052621 A1 | 3/2006 | Korth |
| 2006/0052622 A1 | 3/2006 | Korth |
| 2006/0160935 A1 * | 7/2006 | Hasse et al. ................. 524/262 |

(Continued)

FOREIGN PATENT DOCUMENTS

AT    379 404    1/1986

(Continued)

OTHER PUBLICATIONS

International Search Report for PCT/EP2007/054547 filed May 10, 2007.

(Continued)

*Primary Examiner*—Rabon Sergent
*Assistant Examiner*—Deve Valdez
(74) *Attorney, Agent, or Firm*—Law Office of: Michael A. Sanzo, LLC

(57) ABSTRACT

The invention relates to rubber mixtures, comprising: (A) at least one rubber, (B) at least one oxidic filler and (C) at least one (haloorganyl)alkylpolyethersilane of the general formula (X)(X')(X'')Si—$R^I$-Hal. The rubber mixtures can be used for production of mouldings.

20 Claims, No Drawings

U.S. PATENT DOCUMENTS

| | | | |
|---|---|---|---|
| 2006/0161015 | A1 | 7/2006 | Klockmann |
| 2006/0204422 | A1 | 9/2006 | Korth |
| 2006/0241224 | A1 | 10/2006 | Krafczyk |
| 2007/0049669 | A1 | 3/2007 | Korth |
| 2007/0066760 | A1 | 3/2007 | Korth |
| 2007/0203274 | A1 | 8/2007 | Korth |

FOREIGN PATENT DOCUMENTS

| | | | |
|---|---|---|---|
| DE | 915 334 | | 7/1954 |
| DE | 2035 619 | | 7/1970 |
| DE | 33 14742 | A1 | 4/1983 |
| DE | 195 44 469 | A1 | 3/1997 |
| DE | 196 51 849 | A1 | 6/1998 |
| DE | 199 29 021 | A1 | 6/1999 |
| DE | 100 40 678 | C1 | 8/2000 |
| DE | 101 22 269 | A1 | 11/2002 |
| DE | 103 51 735 | B3 | 12/2004 |
| EP | 0 085 831 | A2 | 8/1983 |
| EP | 0 086 271 | A1 | 8/1983 |
| EP | 0 170 865 | A1 | 2/1986 |
| EP | 0 323 699 | A2 | 7/1989 |
| EP | 0 471 164 | A1 | 2/1992 |
| EP | 0 652 245 | A2 | 5/1995 |
| EP | 0 700 951 | A1 | 3/1996 |
| EP | 0 848 006 | A2 | 4/1998 |
| EP | 0 864 608 | A1 | 9/1998 |
| EP | 0 949 263 | A2 | 10/1999 |
| EP | 0 958 298 | B1 | 11/1999 |
| EP | 0 978 525 | A2 | 2/2000 |
| EP | 1 002 834 | A1 | 5/2000 |
| EP | 1 130 023 | A2 | 9/2001 |
| EP | 1 256 604 | A2 | 11/2002 |
| EP | 1 285 926 | A1 | 2/2003 |
| EP | 1 357 156 | A2 | 10/2003 |
| EP | 1 394 167 | A1 | 3/2004 |
| EP | 1 529 782 | A1 | 5/2005 |
| EP | 1 538 152 | A1 | 6/2005 |
| EP | 1 683 801 | A2 | 7/2006 |
| EP | 1 700 861 | A1 | 9/2006 |
| GB | 1 102 251 | | 2/1968 |
| GB | 1 160 644 | | 8/1969 |
| GB | 1 310 379 | | 3/1973 |
| JP | 62-181346 | | 8/1987 |
| JP | 8-291184 | | 11/1996 |
| JP | 2002-145890 | | 5/2002 |
| JP | 2004-99483 | | 4/2004 |
| JP | 2005-47846 | | 2/2005 |
| JP | 2005-232445 | | 9/2005 |
| WO | WO 99/09036 | | 2/1999 |
| WO | WO 02/31040 | A2 | 4/2002 |
| WO | WO 2007/085521 | A1 | 8/2007 |

OTHER PUBLICATIONS

Written Opinion of the International Searching Authority for PCT/EP2007/054547 filed May 10, 2007.
English translation International Preliminary Report on Patentability for PCT/EP2007/054547 filed May 10, 2007.
Dreschler, et al., "3-Chloropropyltrialkoxysilanes: Key Intermediates for the Commercial Production of Organofunctionalized Silanes and Polysiloxanes," *Agnew. Chem. Int. Ed. Engl.* 25:236-252 (1986).
Sorokin, et al., "Synthesis of 1-(Organylthioalkyl)silatranes from 1-(Haloalkyl)silatranes," *J. Gen. Chem.* 69(3):394-398 (1999). Translated from *Zhurnal Obshchei Khimii* 69(3):407-412 (1999).
Sorokin, et al., "S-(Trimethoxysilymethyl)- and S-(Silatranylmethyl)isothiuronium Halides and Their N-Substituted Derivatives," *Russian J. Gen. Chem.* 74(4): 551-558 (2004). Translated from *Zhurnal Obshchei Khimii* 74(4): 603-610 (2004).
Voronkov, et al., 1-[(Acetylthio)alkyl]silatranes, *J. Gen. Chem. USSR* vol. 45(6): 1367 (Dec. 1975). Translated from *Zhurnal Obschei Khimii* 45(6): 1395 (Jun. 1975).
Voronkov, et al., "1-[(Organothio)alkyl]siltranes," *Russian J. Gen. Chem.* 49(3):529-536 (Sep. 1979). Translated from *Zhurnal Obshchei Khimii* 49(3):605-614 (Mar. 1979).
Voronkov, et al., "Photochemical Organothioation of 1-vinysilatrane and its c-methyl Derivatives," *Russian J. Gen. Chem.* 49(6):1130-1136 (Nov. 1979). Translated from *Zhurnal Obshchei Khimii* 49(6):1285-1292 (Jun. 1979).
Voronkov, et al., "O,O-Dialkyl-S-(1-Silatranylalkyl) Dithiophosphates," *Bull. Acad. Sci. USSR Div. Chem. Sci.* 36(8):1745-1747 (1988). Translated from *Izvestiya Akademii Nauk SSSR* 8:1882-1884 (Aug. 1987).
English language abstract for DE 33 14742 A1, cited as reference B4 above.
English language abstract for DE 195 44 469 A1, cited as reference B5 above.
English language abstract for DE 196 51 849 A1, cited as reference B6 above.
English language abstract for DE 199 29 021 A1, cited as reference B7 above.
English language abstract for DE 100 40 678 C1, cited as reference B8 above.
English language abstract for DE 101 22 269 A1, cited as reference B9 above.
English language abstract for DE 103 51 735 B3, cited as reference B10 above.
English language abstract for EP 0 848 006 A2, cited as reference B18 above.
English language abstract for EP 0 978 525 A2, cited as reference B22 above.
English language abstract for EP 1 130 023 A2, cited as reference B25 above.
English language abstract for EP 1 256 604 A2, cited as reference B26 above.
English language abstract for EP 1 357 156 A2, cited as reference B28 above.
English language abstract for EP 1 394 167, cited as reference B29 above.
English language abstract for JP 62-181346, cited as reference B37 above.
English language abstract for JP 8-291184, cited as reference B38 above.
English language abstract for JP 2002-145890, cited as reference B39 above.
English language abstract for JP 2004-099483, cited as reference B40 above.
English language abstract for JP 2005-047846, cited as reference B41 above.
English language abstract for JP 2005-232445, cited as reference B42 above.

\* cited by examiner

RUBBER MIXTURES

CROSS REFERENCE TO RELATED APPLICATIONS

The present application is U.S. national stage of international application PCT/EP2007/054547, which had an international filing date of May 10, 2007, and which was published in German under PCT Article 21(2) on Dec. 13, 2007. The international application claims priority to German application DE 10 2006 027 235, filed on Jun. 9, 2006. These prior applications are hereby incorporated by reference in their entirety.

The invention relates to rubber mixtures, their production, and their use.

AT 379 404 B discloses vulcanizable rubber mixtures based on halogen-free rubbers. The rubber mixtures comprise from 0.1 to 30% by weight of an organosilane of the formula $X_p$—$C_mH_{2m+1-p}$—$SiR^1(OR)_{3-n}$.

JP 2005232445 A2 moreover discloses rubber additives of the formula $(R^2-O)_{(3-m)}-(R^1)_m-Si-R^3-X$.

JP 2002145890 A2 discloses the production of polysulfidic organo(alkylpolyethersilanes) composed of (halo-organyl)alkylpolyethersilanes.

A disadvantage of the known rubber mixtures, comprising organo(alkylpolyethersilanes), is poor tear strength.

It is an object of the invention to provide rubber mixtures which have improved tear strength after vulcanization.

The invention provides rubber mixtures which are characterized in that they comprise
(A) at least one rubber,
(B) at least one oxidic filler, and
(C) at least one (halo-organyl)alkylpolyethersilane of the formula I $$(X)(X')(X'')Si-R^I-Hal \quad\quad I,$$

where
Hal is F, Cl, Br, or I,
X is an alkylpolyether group O—$(CR^{II}_2)_w$—O—$)_t$Alk, where $R^{II}$, independently of one another, are H, a phenyl group, or an alkyl group,
w=from 2 to 20, preferably from 2 to 17, particularly preferably from 2 to 15, very particularly preferably from 2 to 13, extremely preferably from 2 to 10,
t=from 2 to 20, preferably from 3 to 17, particularly preferably from 3 to 15, very particularly preferably from 4 to 15, extremely preferably from 4 to 10,
Alk is a branched or unbranched, saturated or unsaturated, substituted or unsubstituted, aliphatic, aromatic, or mixed aliphatic/aromatic monovalent hydrocarbon group having more than 6 carbon atoms, preferably $C_7$-$C_{25}$ hydrocarbon group, particularly preferably $C_8$-$C_{22}$ hydrocarbon group, very particularly preferably $C_8$-$C_{17}$ hydrocarbon group, extremely preferably $C_{11}$-$C_{16}$ hydrocarbon group,
X' is branched or unbranched alkyl, preferably $C_1$-$C_{18}$ alkyl, particularly preferably —$CH_3$, —$CH_2$—$CH_3$, —$CH(CH_3)$—$CH_3$, —$CH_2$—$CH_2$—$CH_3$, or $C_4$-$C_{18}$-alkyl, branched or unbranched alkoxy, preferably branched or unbranched $C_1$-$C_{22}$ alkoxy, particularly preferably —$OCH_3$, —$OCH_2$—$CH_3$, —$OCH(CH_3)$—$CH_3$, —$OCH_2$—$CH_2$—$CH_3$, —$OC_9H_{19}$, —$OC_{10}H_{21}$, —$OC_{11}H_{23}$, —$OC_{12}H_{25}$, —$OC_{13}H_{27}$, —$OC_{14}H_{29}$, —$OC_{15}H_{31}$, —$OC_{16}H_{33}$, —$OC_{17}H_{35}$, or —$OC_{18}H_{37}$,
branched or unbranched $C_2$-$C_{25}$ alkenyloxy, preferably $C_4$-$C_{20}$ alkenyloxy, particularly preferably $C_6$-$C_{18}$ alkenyloxy,
$C_6$-$C_{35}$ aryloxy, preferably $C_9$-$C_{30}$ aryloxy, particularly preferably phenyloxy (—$OC_6H_5$), or $C_9$ to $C_{18}$ aryloxy,
a branched or unbranched $C_7$-$C_{35}$ alkylaryloxy group, preferably $C_9$-$C_{30}$ alkylaryloxy group, particularly preferably benzyloxy, (—O—$CH_2$—$C_6H_5$), or —O—$CH_2$—$CH_2$—$C_6H_5$,
a branched or unbranched $C_7$-$C_{35}$ aralkyloxy group, preferably $C_9$-$C_{25}$ aralkyloxy group, particularly preferably tolyloxy (—O—$C_6H_4$—$CH_3$), or a $C_9$ to $C_{18}$ aralkyloxy group,
or is X,
X" is branched or unbranched alkyl, preferably $C_1$-$C_{18}$ alkyl, particularly preferably —$CH_3$, —$CH_2$—$CH_3$, —$CH(CH_3)$—$CH_3$, —$CH_2$—$CH_2$—$CH_3$, or $C_4$-$C_{18}$-alkyl,
branched or unbranched alkoxy, preferably branched or unbranched $C_1$-$C_{22}$ alkoxy, particularly preferably —$OCH_3$, —$OCH_2$—$CH_3$, —$OCH(CH_3)$—$CH_3$, —$OCH_2$—$CH_2$—$CH_3$, —$OC_9H_{19}$, —$OC_{10}H_{21}$, —$OC_{11}H_{23}$, —$OC_{12}H_{25}$, —$OC_{13}H_{27}$, —$OC_{14}H_{29}$, —$OC_{15}H_{31}$, —$OC_{16}H_{33}$, —$OC_{17}H_{35}$, or —$OC_{18}H_{37}$,
branched or unbranched $C_2$-$C_{25}$ alkenyloxy, preferably $C_4$-$C_{20}$ alkenyloxy, particularly preferably $C_6$ to $C_{18}$ alkenyloxy, $C_6$-$C_{35}$ aryloxy, preferably $C_9$-$C_{30}$ aryloxy, particularly preferably phenyloxy (—$OC_6H_5$), or $C_9$ to $C_{18}$ aryloxy,
a branched or unbranched $C_7$-$C_{35}$ alkylaryloxy group, preferably $C_9$-$C_{30}$ alkylaryloxy group, particularly preferably benzyloxy, (—O—$CH_2$—$C_6H_5$), or —O—$CH_2$—$CH_2$—$C_6H_5$,
a branched or unbranched $C_7$-$C_{35}$ aralkyloxy group, preferably $C_9$-$C_{25}$ aralkyloxy group, particularly preferably tolyloxy (—O—$C_6H_4$—$CH_3$), or a $C_9$ to $C_{18}$ aralkyloxy group,
or is X,
$R^I$ is a branched or unbranched, saturated or unsaturated, aliphatic, aromatic, or mixed aliphatic/aromatic divalent $C_1$-$C_{30}$ hydrocarbon group, if appropriate substituted.

The group $(CR^{II}_2)_w$ can be —$CH_2$—$CH_2$—, —$CH_2$—$CH(CH_3)$—, —$CH(CH_3)$—$CH_2$—, —$CH_2$—$CH_2$—$CH_2$—$CH_2$—, —$CH_2$—$CH(—CH_2$—$CH_3)$—, —$CH_2$—$CH(—CH=CH_2)$—, —$CH_2$—$CH_2$—$CH_2$—$CH_2$—$CH_2$—, —$CH_2$—$CH_2$—$CH_2$—$CH_2$—$CH_2$—$CH_2$—, —$CH(C_6H_5)$—$CH_2$—, or —$CH_2$—$CH(C_6H_5)$—.

$R^I$ can be —$CH_2$—, —$CH_2CH_2$—, —$CH_2CH_2CH_2$—, —$CH_2CH_2CH_2CH_2$—, —$CH(CH_3)$—, —$CH_2CH(CH_3)$—, —$CH(CH_3)CH_2$—, —$C(CH_3)_2$—, —$CH(C_2H_5)$—, —$CH_2CH_2CH(CH_3)$—, —$CH_2$ $(CH_3)CH_2CH_2$—, —$CH_2CH(CH_3)CH_2$—, —$CH_2CH_2CH_2CH_2CH_2$—, —$CH_2CH_2CH_2CH_2CH_2CH_2$—, —$CH_2CH_2CH_2CH_2CH_2CH_2CH_2$—, —$CH_2CH_2CH_2CH_2CH_2CH_2CH_2CH_2$—, —$CH_2CH_2CH_2CH_2CH_2CH_2CH_2CH_2CH_2$—, —$CH_2CH_2CH_2CH_2CH_2CH_2CH_2CH_2CH_2CH_2$—, —$CH_2CH_2CH_2CH_2CH_2CH_2CH_2CH_2CH_2CH_2CH_2CH_2$—, —$CH_2 CH_2 CH_2 CH_2 CH_2 CH_2 CH_2 CH_2 CH_2 CH_2 CH_2 CH_2 CH_2 CH_2$—, —$CH_2 CH_2 CH_2 CH_2 CH_2 CH_2 CH_2 CH_2 CH_2 CH_2$—, —$CH_2 CH_2 CH_2 CH_2 CH_2 CH_2 CH_2$—, —$CH_2 CH_2 CH_2 CH_2 CH_2 CH_2 CH_2 CH_2 CH_2 CH_2 CH_2 CH_2 CH_2 CH_2 CH_2$—, or

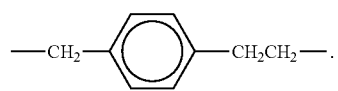

The alkylpolyether group $O-(CR^{II}_2)_w-O-)_t$-Alk can be $O-(CR^{II}_2-CR^{II}_2-CR^{II}_2-O)_t$-Alk, $O-(CR^{II}_2-CR^{II}_2-CR^{II}_2-CR^{II}_2-O)_t$-Alk, or $O-(CR^{II}_2-CR^{II}_2-CR^{II}_2-CR^{II}_2-CR^{II}_2-O)_t$-Alk.

$O-(CR^{II}_2-CR^{II}_2-CR^{II}_2-CR^{II}_2-O)_t$-Alk can preferably be $O-(-CH_2-CH_2-CH_2-CH_2-)_t$-Alk.

The alkylpolyether group $O-(CR^{II}_2)_w-O-)_t$-Alk can be $O-(CR^{II}_2-CR^{II}_2-O)_t$-Alk.

The group $O-(CR^{II}_2-CR^{II}_2-O)_t$-Alk can preferably contain ethylene oxide units, $O-(CH_2-CH_2-O)_t$-Alk, propylene oxide units, such as $O-(CH(CH_3)-CH_2-O)_t$-Alk or $O-(CH_2-CH(CH_3)_2-O)_t$-Alk or butylene oxide units, such as $O-(-CH(CH_2-CH_3)-CH_2-O)_t$-Alk or $O-(-CH_2-CH(CH_2-CH_3)-O)_t$-Alk.

The alkylpolyether group $O-(CR^{II}_2-CR^{II}_2-O)_t$-Alk can be $O-(CH_2-CH_2O)_2-C_7H_{15}$, $O-(CH_2-CH_2O)_3-C_7H_{15}$, $O-(CH_2-CH_2O)_4-C_7H_{15}$, $O-(CH_2-CH_2O)_5-C_7H_{15}$, $O-(CH_2-CH_2O)_6-C_7H_{15}$, $O-(CH_2-CH_2O)_7-C_7H_{15}$, $O-(CH_2-CH_2O)_8-C_7H_{15}$, $O-(CH_2-CH_2O)_9-C_7H_{15}$, $O-(CH_2-CH_2O)_{10}-C_7H_{15}$, $O-(CH_2-CH_2O)_{11}-C_7H_{15}$, $O-(CH_2-CH_2O)_{12}-C_7H_{15}$, $O-(CH_2-CH_2O)_{13}-C_7H_{15}$, $O-(CH_2-CH_2O)_{14}-C_7H_{15}$, $O-(CH_2-CH_2O)_{15}-C_7H_{15}$, $O-(CH_2-CH_2O)_{16}-C_7H_{15}$, $O-(CH_2-CH_2O)_{17}-C_7H_{15}$, $O-(CH_2-CH_2O)_{18}-C_7H_{15}$, $O-(CH_2-CH_2O)_{19}-C_7H_{15}$, $O-(CH_2-CH_2O)_{20}-C_7H_{15}$, $O-(CH(CH_3)-CH_2O)_2-C_7H_{15}$, $O-(CH(CH_3)-CH_2O)_3-C_7H_{15}$, $O-(CH(CH_3)-CH_2O)_4-C_7H_{15}$, $O-(CH(CH_3)-CH_2O)_5-C_7H_{15}$, $O-(CH(CH_3)-CH_2O)_6-C_7H_{15}$, $O-(CH(CH_3)-CH_2O)_7-C_7H_{15}$, $O-(CH(CH_3)-CH_2O)_8-C_7H_{15}$, $O-(CH(CH_3)-CH_2O)_9-C_7H_{15}$, $O-(CH(CH_3)-CH_2O)_{10}-C_7H_{15}$, $O-(CH(CH_3)-CH_2O)_{11}-C_7H_{15}$, $O-(CH(CH_3)-CH_2O)_{12}-C_7H_{15}$, $O-(CH(CH_3)-CH_2O)_{13}-C_7H_{15}$, $O-(CH(CH_3)-CH_2O)_{14}-C_7H_{15}$, $O-(CH(CH_3)-CH_2O)_{15}-C_7H_{15}$, $O-(CH(CH_3)-CH_2O)_{16}-C_7H_{15}$, $O-(CH(CH_3)-CH_2O)_{17}-C_7H_{15}$, $O-(CH(CH_3)-CH_2O)_{18}-C_7H_{15}$, $O-(CH(CH_3)-CH_2O)_{19}-C_7H_{15}$, $O-(CH(CH_3)-CH_2O)_{20}-C_7H_{15}$, $O-(CH_2-CH_2O)_2-C_8H_{17}$, $O-(CH_2-CH_2O)_3-C_8H_{17}$, $O-(CH_2-CH_2O)_4-C_8H_{17}$, $O-(CH_2-CH_2O)_5-C_8H_{17}$, $O-(CH_2-CH_2O)_6-C_8H_{17}$, $O-(CH_2-CH_2O)_7-C_8H_{17}$, $O-(CH(CH_3)-CH_2O)_2-C_8H_{17}$, $O-(CH(CH_3)-CH_2O)_3-C_8H_{17}$, $O-(CH(CH_3)-CH_2O)_4-C_8H_{17}$, $O-(CH(CH_3)-CH_2O)_5-C_8H_{17}$, $O-(CH(CH_3)-CH_2O)_6-C_8H_{17}$, $O-(CH(CH_3)-CH_2O)_7-C_8H_{17}$, $O-(CH_2-CH_2O)_2-C_9H_{19}$, $O-(CH_2-CH_2O)_3-C_9H_{19}$, $O-(CH_2-CH_2O)_4-C_9H_{19}$, $O-(CH_2-CH_2O)_5-C_9H_{19}$, $O-(CH_2-CH_2O)_6-C_9H_{19}$, $O-(CH_2-CH_2O)_7-C_9H_{19}$, $O-(CH(CH_3)-CH_2O)_2-C_9H_{19}$, $O-(CH(CH_3)-CH_2O)_3-C_9H_{19}$, $O-(CH(CH_3)-CH_2O)_4-C_9H_{19}$, $O-(CH(CH_3)-CH_2O)_5-C_9H_{19}$, $O-(CH(CH_3)-CH_2O)_6-C_9H_{19}$, $O-(CH(CH_3)-CH_2O)_7-C_9H_{19}$, $O-(CH_2-CH_2O)_2-C_{10}H_{21}$, $O-(CH_2-CH_2O)_3-C_{10}H_{21}$, $O-(CH_2-CH_2O)_4-C_{10}H_{21}$, $O-(CH_2-CH_2O)_5-C_{10}H_{21}$, $O-(CH_2-CH_2O)_6-C_{10}H_{21}$, $O-(CH_2-CH_2O)_7-C_{10}H_{21}$, $O-(CH(CH_3)-CH_2O)_2-C_{10}H_{21}$, $O-(CH(CH_3)-CH_2O)_3-C_{10}H_{21}$, $O-(CH(CH_3)-CH_2O)_4-C_{10}H_{21}$, $O-(CH(CH_3)-CH_2O)_5-C_{10}H_{21}$, $O-(CH(CH_3)-CH_2O)_6-C_{10}H_{21}$, $O-(CH(CH_3)-CH_2O)_7-C_{10}H_{21}$, $O-(CH_2-CH_2O)_2-C_{11}H_{23}$, $O-(CH_2-CH_2O)_3-C_{11}H_{23}$, $O-(CH_2-CH_2O)_4-C_{11}H_{23}$, $O-(CH_2-CH_2O)_5-C_{11}H_{23}$, $O-(CH_2-CH_2O)_6-C_{11}H_{23}$, $O-(CH_2-CH_2O)_7-C_{10}H_{23}$, $O-(CH(CH_3)-CH_2O)_2-C_{11}H_{23}$, $O-(CH(CH_3)-CH_2O)_3-C_{10}H_{23}$, $O-(CH(CH_3)-CH_2O)_4-C_{11}H_{23}$, $O-(CH(CH_3)-CH_2O)_5-C_{10}H_{23}$, $O-(CH(CH_3)-CH_2O)_6-C_{11}H_{23}$, $O-(CH(CH_3)-CH_2O)_7-C_{11}H_{23}$, $O-(CH_2-CH_2O)_2-C_{12}H_{25}$, $O-(CH_2-CH_2O)_3-C_{12}H_{25}$, $O-(CH_2-CH_2O)_4-C_{12}H_{25}$, $O-(CH_2-CH_2O)_5-C_{12}H_{25}$, $O-(CH_2-CH_2O)_6-C_{12}H_{25}$, $O-(CH_2-CH_2O)_7-C_{12}H_{25}$, $O-(CH(CH_3)-CH_2O)_2-C_{12}H_{25}$, $O-(CH(CH_3)-CH_2O)_3-C_{12}H_{25}$, $O-(CH(CH_3)-CH_2O)_4-C_{12}H_{25}$, $O-(CH(CH_3)-CH_2O)_5-C_{12}H_{25}$, $O-(CH(CH_3)-CH_2O)_6-C_{12}H_{25}$, $O-(CH(CH_3)-CH_2O)_7-C_{12}H_{25}$, $O-(CH_2-CH_2O)_2-C_{13}H_{27}$, $O-(CH_2-CH_2O)_3-C_{13}H_{27}$, $O-(CH_2-CH_2O)_4-C_{13}H_{27}$, $O-(CH_2-CH_2O)_5-C_{13}H_{27}$, $O-(CH_2-CH_2O)_6-C_{13}H_{27}$, $O-(CH_2-CH_2O)_7-C_{13}H_{27}$, $O-(CH(CH_3)-CH_2O)_2-C_{13}H_{27}$, $O-(CH(CH_3)-CH_2O)_3-C_{13}H_{27}$, $O-(CH(CH_3)-CH_2O)_4-C_{13}H_{27}$, $O-(CH(CH_3)-CH_2O)_5-C_{13}H_{27}$, $O-(CH(CH_3)-CH_2O)_6-C_{13}H_{27}$, $O-(CH(CH_3)-CH_2O)_7-C_{13}H_{27}$, $O-(CH_2-CH_2O)_2-C_{14}H_{29}$, $O-(CH_2-CH_2O)_3-C_{14}H_{29}$, $O-(CH_2-CH_2O)_4-C_{14}H_{29}$, $O-(CH_2-CH_2O)_5-C_{14}H_{29}$, $O-(CH_2-CH_2O)_6-C_{14}H_{29}$, $O-(CH_2-CH_2O)_7-C_{14}H_{29}$, $O-(CH(CH_3)-CH_2O)_2-C_{14}H_{29}$, $O-(CH(CH_3)-CH_2O)_3-C_{14}H_{29}$, $O-(CH(CH_3)-CH_2O)_4-C_{14}H_{29}$, $O-(CH(CH_3)-CH_2O)_5-C_{14}H_{29}$, $O-(CH(CH_3)-CH_2O)_6-C_{14}H_{29}$, $O-(CH(CH_3)-CH_2O)_7-C_{14}H_{29}$, $O-(CH_2-CH_2O)_2-C_{15}H_{31}$, $O-(CH_2-CH_2O)_3-C_{15}H_{31}$, $O-(CH_2-CH_2O)_4-C_{15}H_{31}$, $O-(CH_2-CH_2O)_5-C_{15}H_{31}$, $O-(CH_2-CH_2O)_6-C_{15}H_{31}$, $O-(CH_2-CH_2O)_7-C_{15}H_{31}$, $O-(CH(CH_3)-CH_2O)_2-C_{15}H_{31}$, $O-(CH(CH_3)-CH_2O)_3-C_{15}H_{31}$, $O-(CH(CH_3)-CH_2O)_4-C_{15}H_{31}$, $O-(CH(CH_3)-CH_2O)_5-C_{15}H_{31}$, $O-(CH(CH_3)-CH_2O)_6-C_{15}H_{31}$, $O-(CH(CH_3)-CH_2O)_7-C_{15}H_{31}$, $O-(CH_2-CH_2O)_2-C_{16}H_{33}$, $O-(CH_2-CH_2O)_3-C_{16}H_{33}$, $O-(CH_2-CH_2O)_4-C_{16}H_{33}$, $O-(CH_2-CH_2O)_5-C_{16}H_{33}$, $O-(CH_2-CH_2O)_6-C_{16}H_{33}$, $O-(CH_2-CH_2O)_7-C_{16}H_{33}$, $O-(CH(CH_3)-CH_2O)_2-C_{16}H_{33}$, $O-(CH(CH_3)-CH_2O)_3-C_{16}H_{33}$, $O-(CH(CH_3)-CH_2O)_4-C_{16}H_{33}$, $O-(CH(CH_3)-CH_2O)_5-C_{16}H_{33}$, $O-(CH(CH_3)-CH_2O)_6-C_{16}H_{33}$, $O-(CH(CH_3)-CH_2O)_7-C_{16}H_{33}$, $O-(CH_2-CH_2O)_2-C_{17}H_{35}$, $O-(CH_2-CH_2O)_3-C_{17}H_{35}$, $O-(CH_2-CH_2O)_4-C_{17}H_{35}$, $O-(CH_2-CH_2O)_5-C_{17}H_{35}$, $O-(CH_2-CH_2O)_6-C_{17}H_{35}$, $O-(CH_2-CH_2O)_7-C_{17}H_{35}$, $O-(CH(CH_3)-CH_2O)_2-C_{17}H_{35}$, $O-(CH(CH_3)-CH_2O)_3-C_{17}H_{35}$, $O-(CH(CH_3)-CH_2O)_4-C_{17}H_{35}$, $O-(CH(CH_3)-CH_2O)_5-C_{17}H_{35}$, $O-(CH(CH_3)-CH_2O)_6-C_{17}H_{35}$, $O-(CH(CH_3)-CH_2O)_7-C_{17}H_{35}$, $O-(CH_2-CH_2O)_2-C_{18}H_{37}$, $O-(CH_2-CH_2O)_3-C_{18}H_{37}$, $O-(CH_2-CH_2O)_4-C_{18}H_{37}$, $O-(CH_2-CH_2O)_5-C_{18}H_{37}$, $O-(CH_2-CH_2O)_6-C_{18}H_{37}$, $O-(CH_2-CH_2O)_7-C_{18}H_{37}$, $O-(CH(CH_3)-CH_2O)_2-C_{18}H_{37}$, $O-(CH(CH_3)-CH_2O)_3-C_{18}H_{37}$, $O-(CH(CH_3)-CH_2O)_4-C_{18}H_{37}$, $O-(CH(CH_3)-CH_2O)_5-C_{18}H_{37}$, $O-(CH(CH_3)-CH_2O)_6-C_{18}H_{37}$, $O-(CH(CH_3)-CH_2O)_7-C_{18}H_{37}$, $O-(CH_2-CH_2O)_2-C_6H_4-C_9H_{19}$, $O-(CH_2-CH_2O)_3-C_6H_4-C_9H_{19}$, $O-(CH_2-CH_2O)_4-C_6H_4-C_9H_{19}$, $O-(CH_2-CH_2O)_5-C_6H_4-C_9H_{19}$, $O-(CH_2-CH_2O)_6-C_6H_4-C_9H_{19}$, $O-(CH_2-CH_2O)_7-C_6H_4-C_9H_{19}$, $O-(CH(CH_3)-CH_2O)_2-C_6H_4-C_9H_{19}$, $O-(CH(CH_3)-CH_2O)_3-C_6H_4-C_9H_{19}$, $O-(CH(CH_3)-CH_2O)_4-C_6H_4-C_9H_{19}$, $O-(CH(CH_3)-CH_2O)_5-C_6H_4-

$C_9H_{19}$, $O-(CH(CH_3)-CH_2O)_6-C_6H_4-C_9H_{19}$, or $O-(CH(CH_3)-CH_2O)_7-C_6H_4-C_9H_{19}$, where the hydrocarbon chains (Alk) can be branched or unbranched.

(Halo-organyl)alkylpolyethersilanes of the general formula I can be:

$[(C_7H_{15}O-(CH_2-CH_2O)_2](Me)_2Si(CH_2)_3Hal$,
$[(C_7H_{15}O-(CH_2-CH_2O)_3](Me)_2Si(CH_2)_3Hal$,
$[(C_7H_{15}O-(CH_2-CH_2O)_4](Me)_2Si(CH_2)_3Hal$,
$[(C_7H_{15}O-(CH_2-CH_2O)_5](Me)_2Si(CH_2)_3Hal$,
$[(C_7H_{15}O-(CH_2-CH_2O)_6](Me)_2Si(CH_2)_3Hal$,
$[(C_8H_{17}O-(CH_2-CH_2O)_2](Me)_2Si(CH_2)_3Hal$,
$[(C_8H_{17}O-(CH_2-CH_2O)_3](Me)_2Si(CH_2)_3Hal$,
$[(C_8H_{17}O-(CH_2-CH_2O)_4](Me)_2Si(CH_2)_3Hal$,
$[(C_8H_{17}O-(CH_2-CH_2O)_5](Me)_2Si(CH_2)_3Hal$,
$[(C_8H_{17}O-(CH_2-CH_2O)_6](Me)_2Si(CH_2)_3Hal$,
$[(C_9H_{19}O-(CH_2-CH_2O)_2](Me)_2Si(CH_2)_3Hal$,
$[(C_9H_{19}O-(CH_2-CH_2O)_3](Me)_2Si(CH_2)_3Hal$,
$[(C_9H_{19}O-(CH_2-CH_2O)_4](Me)_2Si(CH_2)_3Hal$,
$[(C_9H_{19}O-(CH_2-CH_2O)_5](Me)_2Si(CH_2)_3Hal$,
$[(C_9H_{19}O-(CH_2-CH_2O)_6](Me)_2Si(CH_2)_3Hal$,
$[(C_7H_{15}O-(CH_2-CH_2O)_2]_2(Me)Si(CH_2)_3Hal$,
$[(C_7H_{15}O-(CH_2-CH_2O)_3](Me)Si(CH_2)_3Hal$,
$[(C_7H_{15}O-(CH_2-CH_2O)_4]_2(Me)Si(CH_2)_3Hal$,
$[(C_7H_{15}O-(CH_2-CH_2O)_5]_2(Me)Si(CH_2)_3Hal$,
$[(C_7H_{15}O-(CH_2-CH_2O)_6]_2(Me)Si(CH_2)_3Hal$,
$[(C_8H_{17}O-(CH_2-CH_2O)_2]_2(Me)Si(CH_2)_3Hal$,
$[(C_8H_{17}O-(CH_2-CH_2O)_3]_2(Me)Si(CH_2)_3Hal$,
$[(C_8H_{17}O-(CH_2-CH_2O)_4]_2(Me)Si(CH_2)_3Hal$,
$[(C_8H_{17}O-(CH_2-CH_2O)_5]_2(Me)Si(CH_2)_3Hal$,
$[(C_8H_{17}O-(CH_2-CH_2O)_6]_2(Me)Si(CH_2)_3Hal$,
$[(C_9H_{19}O-(CH_2-CH_2O)_2]_2(Me)Si(CH_2)_3Hal$,
$[(C_9H_{19}O-(CH_2-CH_2O)_3]_2(Me)Si(CH_2)_3Hal$,
$[(C_9H_{19}O-(CH_2-CH_2O)_4]_2(Me)Si(CH_2)_3Hal$,
$[(C_9H_{19}O-(CH_2-CH_2O)_5]_2(Me)Si(CH_2)_3Hal$,
$[(C_9H_{19}O-(CH_2-CH_2O)_6]_2(Me)Si(CH_2)_3Hal$,
$[(C_7H_{15}O-(CH_2-CH_2O)_2](Me)(EtO)Si(CH_2)_3Hal$,
$[(C_7H_{15}O-(CH_2-CH_2O)_3](Me)(EtO)Si(CH_2)_3Hal$,
$[(C_7H_{15}O-(CH_2-CH_2O)_4](Me)(EtO)Si(CH_2)_3Hal$,
$[(C_7H_{15}O-(CH_2-CH_2O)_5](Me)(EtO)Si(CH_2)_3Hal$,
$[(C_7H_{15}O-(CH_2-CH_2O)_6](Me)(EtO)Si(CH_2)_3Hal$,
$[(C_8H_{17}O-(CH_2-CH_2O)_2](Me)(EtO)Si(CH_2)_3Hal$,
$[(C_8H_{17}O-(CH_2-CH_2O)_3](Me)(EtO)Si(CH_2)_3Hal$,
$[(C_8H_{17}O-(CH_2-CH_2O)_4](Me)(EtO)Si(CH_2)_3Hal$,
$[(C_8H_{17}O-(CH_2-CH_2O)_5](Me)(EtO)Si(CH_2)_3Hal$,
$[(C_8H_{17}O-(CH_2-CH_2O)_6](Me)(EtO)Si(CH_2)_3Hal$,
$[(C_9H_{19}O-(CH_2-CH_2O)_2](Me)(EtO)Si(CH_2)_3Hal$,
$[(C_9H_{19}O-(CH_2-CH_2O)_3](Me)(EtO)Si(CH_2)_3Hal$,
$[(C_9H_{19}O-(CH_2-CH_2O)_4](Me)(EtO)Si(CH_2)_3Hal$,
$[(C_9H_{19}O-(CH_2-CH_2O)_5](Me)(EtO)Si(CH_2)_3Hal$,
$[(C_9H_{19}O-(CH_2-CH_2O)_6](Me)(EtO)Si(CH_2)_3Hal$,
$[(C_{10}H_{21}O-(CH_2-CH_2O)_2](Me)(EtO)Si(CH_2)_3Hal$,
$[(C_{10}H_{21}O-(CH_2-CH_2O)_3](Me)(EtO)Si(CH_2)_3Hal$,
$[(C_{10}H_{21}O-(CH_2-CH_2O)_4](Me)(EtO)Si(CH_2)_3Hal$,
$[(C_{10}H_{21}O-(CH_2-CH_2O)_5](Me)(EtO)Si(CH_2)_3Hal$,
$[(C_{10}H_{21}O-(CH_2-CH_2O)_6](Me)(EtO)Si(CH_2)_3Hal$,
$[(C_{11}H_{23}O-(CH_2-CH_2O)_2](Me)(EtO)Si(CH_2)_3Hal$,
$[(C_{11}H_{23}O-(CH_2-CH_2O)_3](Me)(EtO)Si(CH_2)_3Hal$,
$[(C_{11}H_{23}O-(CH_2-CH_2O)_4](Me)(EtO)Si(CH_2)_3Hal$,
$[(C_{11}H_{23}O-(CH_2-CH_2O)_5](Me)(EtO)Si(CH_2)_3Hal$,
$[(C_{11}H_{23}O-(CH_2-CH_2O)_6](Me)(EtO)Si(CH_2)_3Hal$,
$[(C_{12}H_{25}O-(CH_2-CH_2O)_2](Me)(EtO)Si(CH_2)_3Hal$,
$[(C_{12}H_{25}O-(CH_2-CH_2O)_3](Me)(EtO)Si(CH_2)_3Hal$,
$[(C_{12}H_{25}O-(CH_2-CH_2O)_4](Me)(EtO)Si(CH_2)_3Hal$,
$[(C_{12}H_{25}O-(CH_2-CH_2O)_5](Me)(EtO)Si(CH_2)_3Hal$,
$[(C_{12}H_{25}O-(CH_2-CH_2O)_6](Me)(EtO)Si(CH_2)_3Hal$,
$[(C_{13}H_{27}O-(CH_2-CH_2O)_2](Me)(EtO)Si(CH_2)_3Hal$,
$[(C_{13}H_{27}O-(CH_2-CH_2O)_3](Me)(EtO)Si(CH_2)_3Hal$,
$[(C_{13}H_{27}O-(CH_2-CH_2O)_4](Me)(EtO)Si(CH_2)_3Hal$,
$[(C_{13}H_{27}O-(CH_2-CH_2O)_5](Me)(EtO)Si(CH_2)_3Hal$,
$[(C_{13}H_{27}O-(CH_2-CH_2O)_6](Me)(EtO)Si(CH_2)_3Hal$,
$[(C_{14}H_{29}O-(CH_2-CH_2O)_2](Me)(EtO)Si(CH_2)_3Hal$,
$[(C_{14}H_{29}O-(CH_2-CH_2O)_3](Me)(EtO)Si(CH_2)_3Hal$,
$[(C_{14}H_{29}O-(CH_2-CH_2O)_4](Me)(EtO)Si(CH_2)_3Hal$,
$[(C_{14}H_{29}O-(CH_2-CH_2O)_5](Me)(EtO)Si(CH_2)_3Hal$,
$[(C_{14}H_{29}O-(CH_2-CH_2O)_6](Me)(EtO)Si(CH_2)_3Hal$,
$[(C_{15}H_{31}O-(CH_2-CH_2O)_2](Me)(EtO)Si(CH_2)_3Hal$,
$[(C_{15}H_{31}O-(CH_2-CH_2O)_3](Me)(EtO)Si(CH_2)_3Hal$,
$[(C_{15}H_{31}O-(CH_2-CH_2O)_4](Me)(EtO)Si(CH_2)_3Hal$,
$[(C_{15}H_{31}O-(CH_2-CH_2O)_5](Me)(EtO)Si(CH_2)_3Hal$,
$[(C_{15}H_{31}O-(CH_2-CH_2O)_6](Me)(EtO)Si(CH_2)_3Hal$,
$[(C_{16}H_{33}O-(CH_2-CH_2O)_2](Me)(EtO)Si(CH_2)_3Hal$,
$[(C_{16}H_{33}O-(CH_2-CH_2O)_3](Me)(EtO)Si(CH_2)_3Hal$,
$[(C_{16}H_{33}O-(CH_2-CH_2O)_4](Me)(EtO)Si(CH_2)_3Hal$,
$[(C_{16}H_{33}O-(CH_2-CH_2O)_5](Me)(EtO)Si(CH_2)_3Hal$,
$[(C_{16}H_{33}O-(CH_2-CH_2O)_6](Me)(EtO)Si(CH_2)_3Hal$,
$[(C_{17}H_{35}O-(CH_2-CH_2O)_2](Me)(EtO)Si(CH_2)_3Hal$,
$[(C_{17}H_{35}O-(CH_2-CH_2O)_3](Me)(EtO)Si(CH_2)_3Hal$,
$[(C_{17}H_{35}O-(CH_2-CH_2O)_4](Me)(EtO)Si(CH_2)_3Hal$,
$[(C_{17}H_{35}O-(CH_2-CH_2O)_5](Me)(EtO)Si(CH_2)_3Hal$,
$[(C_{17}H_{35}O-(CH_2-CH_2O)_6](Me)(EtO)Si(CH_2)_3Hal$,
$[(C_{18}H_{37}O-(CH_2-CH_2O)_2](Me)(EtO)Si(CH_2)_3Hal$,
$[(C_{18}H_{37}O-(CH_2-CH_2O)_3](Me)(EtO)Si(CH_2)_3Hal$,
$[(C_{18}H_{37}O-(CH_2-CH_2O)_4](Me)(EtO)Si(CH_2)_3Hal$,
$[(C_{18}H_{37}O-(CH_2-CH_2O)_5](Me)(EtO)Si(CH_2)_3Hal$,
$[(C_{18}H_{37}O-(CH_2-CH_2O)_6](Me)(EtO)Si(CH_2)_3Hal$,
$[(C_7H_{15}O-(CH_2-CH_2O)_2](Me)(MeO)Si(CH_2)_3Hal$,
$[(C_7H_{15}O-(CH_2-CH_2O)_3](Me)(MeO)Si(CH_2)_3Hal$,
$[(C_7H_{15}O-(CH_2-CH_2O)_4](Me)(MeO)Si(CH_2)_3Hal$,
$[(C_7H_{15}O-(CH_2-CH_2O)_5](Me)(MeO)Si(CH_2)_3Hal$,
$[(C_7H_{15}O-(CH_2-CH_2O)_6](Me)(MeO)Si(CH_2)_3Hal$,
$[(C_8H_{17}O-(CH_2-CH_2O)_2](Me)(MeO)Si(CH_2)_3Hal$,
$[(C_8H_{17}O-(CH_2-CH_2O)_3](Me)(MeO)Si(CH_2)_3Hal$,
$[(C_8H_{17}O-(CH_2-CH_2O)_4](Me)(MeO)Si(CH_2)_3Hal$,
$[(C_8H_{17}O-(CH_2-CH_2O)_5](Me)(MeO)Si(CH_2)_3Hal$,
$[(C_8H_{17}O-(CH_2-CH_2O)_6](Me)(MeO)Si(CH_2)_3Hal$,
$[(C_9H_9O-(CH_2-CH_2O)_2](Me)(MeO)Si(CH_2)_3Hal$,
$[(C_9H_{19}O-(CH_2-CH_2O)_3](Me)(MeO)Si(CH_2)_3Hal$,
$[(C_9H_9O-(CH_2-CH_2O)_4](Me)(MeO)Si(CH_2)_3Hal$,
$[(C_9H_{19}O-(CH_2-CH_2O)_5](Me)(MeO)Si(CH_2)_3Hal$,
$[(C_9H_{19}O-(CH_2-CH_2O)_6](Me)(MeO)Si(CH_2)_3Hal$,
$[(C_7H_{15}O-(CH_2-CH_2O)_2](MeO)_2Si(CH_2)_3Hal$,
$[(C_7H_{15}O-(CH_2-CH_2O)_3](MeO)_2Si(CH_2)_3Hal$,
$[(C_7H_{15}O-(CH_2-CH_2O)_4](MeO)_2Si(CH_2)_3Hal$,
$[(C_7H_{15}O-(CH_2-CH_2O)_5](MeO)_2Si(CH_2)_3Hal$,
$[(C_7H_{15}O-(CH_2-CH_2O)_6](MeO)_2Si(CH_2)_3Hal$,
$[(C_8H_{17}O-(CH_2-CH_2O)_2](MeO)_2Si(CH_2)_3Hal$,
$[(C_8H_{17}O-(CH_2-CH_2O)_3](MeO)_2Si(CH_2)_3Hal$,
$[(C_8H_{17}O-(CH_2-CH_2O)_4](MeO)_2Si(CH_2)_3Hal$,
$[(C_8H_{17}O-(CH_2-CH_2O)_5](MeO)_2Si(CH_2)_3Hal$,
$[(C_8H_{17}O-(CH_2-CH_2O)_6](MeO)_2Si(CH_2)_3Hal$,
$[(C_9H_{19}O-(CH_2-CH_2O)_2](MeO)_2Si(CH_2)_3Hal$,
$[(C_9H_{19}O-(CH_2-CH_2O)_3](MeO)_2Si(CH_2)_3Hal$,
$[(C_9H_{19}O-(CH_2-CH_2O)_4](MeO)_2Si(CH_2)_3Hal$,
$[(C_9H_{19}O-(CH_2-CH_2O)_5](MeO)_2Si(CH_2)_3Hal$,
$[(C_9H_{19}O-(CH_2-CH_2O)_6](MeO)_2Si(CH_2)_3Hal$,
$[(C_{10}H_{21}O-(CH_2-CH_2O)_2](MeO)_2Si(CH_2)_3Hal$,
$[(C_{10}H_{21}O-(CH_2-CH_2O)_3](MeO)_2Si(CH_2)_3Hal$,
$[(C_{10}H_{21}O-(CH_2-CH_2O)_4](MeO)_2Si(CH_2)_3Hal$,
$[(C_{10}H_{21}O-(CH_2-CH_2O)_5](MeO)_2Si(CH_2)_3Hal$,
$[(C_{10}H_{21}O-(CH_2-CH_2O)_6](MeO)_2Si(CH_2)_3Hal$,
$[(C_{11}H_{23}O-(CH_2-CH_2O)_2](MeO)_2Si(CH_2)_3Hal$,
$[(C_{11}H_{23}O-(CH_2-CH_2O)_3](MeO)_2Si(CH_2)_3Hal$,
$[(C_{11}H_{23}O-(CH_2-CH_2O)_4](MeO)_2Si(CH_2)_3Hal$,

[(C₁₁H₂₃O—(CH₂—CH₂O)₅](MeO)₂Si(CH₂)₃Hal,
[(C₁₁H₂₃O—(CH₂—CH₂O)₆](MeO)₂Si(CH₂)₃Hal,
[(C₁₂H₂₅O—(CH₂—CH₂O)₂](MeO)₂Si(CH₂)₃Hal,
[(C₁₂H₂₅O—(CH₂—CH₂O)₃](MeO)₂Si(CH₂)₃Hal,
[(C₁₂H₂₅O—(CH₂—CH₂O)₄](MeO)₂Si(CH₂)₃Hal,
[(C₁₂H₂₅O—(CH₂—CH₂O)₅](MeO)₂Si(CH₂)₃Hal,
[(C₁₂H₂₅O—(CH₂—CH₂O)₆](MeO)₂Si(CH₂)₃Hal,
[(C₁₃H₂₇O—(CH₂—CH₂O)₂](MeO)₂Si(CH₂)₃Hal,
[(C₁₃H₂₇O—(CH₂—CH₂O)₃](MeO)₂Si(CH₂)₃Hal,
[(C₁₃H₂₇O—(CH₂—CH₂O)₄](MeO)₂Si(CH₂)₃Hal,
[(C₁₃H₂₇O—(CH₂—CH₂O)₅](MeO)₂Si(CH₂)₃Hal,
[(C₁₃H₂₇O—(CH₂—CH₂O)₆](MeO)₂Si(CH₂)₃Hal,
[(C₁₄H₂₉O—(CH₂—CH₂O)₂](MeO)₂Si(CH₂)₃Hal,
[(C₁₄H₂₉O—(CH₂—CH₂O)₃](MeO)₂Si(CH₂)₃Hal,
[(C₁₄H₂₉O—(CH₂—CH₂O)₄](MeO)₂Si(CH₂)₃Hal,
[(C₁₄H₂₉O—(CH₂—CH₂O)₅](MeO)₂Si(CH₂)₃Hal,
[(C₁₄H₂₉O—(CH₂—CH₂O)₆](MeO)₂Si(CH₂)₃Hal,
[(C₁₆H₃₃O—(CH₂—CH₂O)₂](MeO)₂Si(CH₂)₃Hal,
[(C₁₆H₃₃O—(CH₂—CH₂O)₃](MeO)₂Si(CH₂)₃Hal,
[(C₁₆H₃₃O—(CH₂—CH₂O)₄](MeO)₂Si(CH₂)₃Hal,
[(C₁₆H₃₃O—(CH₂—CH₂O)₅](MeO)₂Si(CH₂)₃Hal,
[(C₁₆H₃₃O—(CH₂—CH₂O)₆](MeO)₂Si(CH₂)₃Hal,
[(C₁₈H₃₇O—(CH₂—CH₂O)₂](MeO)₂Si(CH₂)₃Hal,
[(C₁₈H₃₇O—(CH₂—CH₂O)₃](MeO)₂Si(CH₂)₃Hal,
[(C₁₈H₃₇O—(CH₂—CH₂O)₄](MeO)₂Si(CH₂)₃Hal,
[(C₁₈H₃₇O—(CH₂—CH₂O)₅](MeO)₂Si(CH₂)₃Hal,
[(C₁₈H₃₇O—(CH₂—CH₂O)₆](MeO)₂Si(CH₂)₃Hal,
[(C₉H₁₉O—(CH₂—CH₂O)₂]₂(MeO)Si(CH₂)₃Hal,
[(C₉H₁₉O—(CH₂—CH₂O)₃]₂(MeO)Si(CH₂)₃Hal,
[(C₉H₁₉O—(CH₂—CH₂O)₄]₂(MeO)Si(CH₂)₃Hal,
[(C₉H₁₉O—(CH₂—CH₂O)₅]₂(MeO)Si(CH₂)₃Hal,
[(C₉H₁₉O—(CH₂—CH₂O)₆]₂(MeO)Si(CH₂)₃Hal,
[(C₁₂H₂₅O—(CH₂—CH₂O)₂]₂(MeO)Si(CH₂)₃Hal,
[(C₁₂H₂₅O—(CH₂—CH₂O)₃]₂(MeO)Si(CH₂)₃Hal,
[(C₁₂H₂₅O—(CH₂—CH₂O)₄]₂(MeO)Si(CH₂)₃Hal,
[(C₁₂H₂₅O—(CH₂—CH₂O)₅]₂(MeO)Si(CH₂)₃Hal,
[(C₁₂H₂₅O—(CH₂—CH₂O)₆]₂(MeO)Si(CH₂)₃Hal,
[(CH₃H₂₇O—(CH₂—CH₂O)₂]₂(MeO)Si(CH₂)₃Hal,
[(C₁₃H₂₇O—(CH₂—CH₂O)₃]₂(MeO)Si(CH₂)₃Hal,
[(C₁₃H₂₇O—(CH₂—CH₂O)₄]₂(MeO)Si(CH₂)₃Hal,
[(C₁₃H₂₇O—(CH₂—CH₂O)₅]₂(MeO)Si(CH₂)₃Hal,
[(C₁₃H₂₇O—(CH₂—CH₂O)₆]₂(MeO)Si(CH₂)₃Hal,
[(C₁₄H₂₉O—(CH₂—CH₂O)₂]₂(MeO)Si(CH₂)₃Hal,
[(C₁₄H₂₉O—(CH₂—CH₂O)₃]₂(MeO)Si(CH₂)₃Hal,
[(C₁₄H₂₉O—(CH₂—CH₂O)₄]₂(MeO)Si(CH₂)₃Hal,
[(C₁₄H₂₉O—(CH₂—CH₂O)₅]₂(MeO)Si(CH₂)₃Hal,
[(C₁₄H₂₉O—(CH₂—CH₂O)₆]₂(MeO)Si(CH₂)₃Hal,
[(C₁₆H₃₃O—(CH₂—CH₂O)₂]₂(MeO)Si(CH₂)₃Hal,
[(C₁₆H₃₃O—(CH₂—CH₂O)₃]₂(MeO)Si(CH₂)₃Hal,
[(C₁₆H₃₃O—(CH₂—CH₂O)₄]₂(MeO)Si(CH₂)₃Hal,
[(C₁₆H₃₃O—(CH₂—CH₂O)₅]₂(MeO)Si(CH₂)₃Hal,
[(C₁₆H₃₃O—(CH₂—CH₂O)₆]₂(MeO)Si(CH₂)₃Hal,
[(C₁₈H₃₇O—(CH₂—CH₂O)₂]₂(MeO)Si(CH₂)₃Hal,
[(C₁₈H₃₇O—(CH₂—CH₂O)₃]₂(MeO)Si(CH₂)₃Hal,
[(C₁₈H₃₇O—(CH₂—CH₂O)₄]₂(MeO)Si(CH₂)₃Hal,
[(C₁₈H₃₇O—(CH₂—CH₂O)₅]₂(MeO)Si(CH₂)₃Hal,
[(C₁₈H₃₇O—(CH₂—CH₂O)₆]₂(MeO)Si(CH₂)₃Hal,
[(C₇H₁₅O—(CH₂—CH₂O)₂](EtO)₂Si(CH₂)₃Hal,
[(C₇H₁₅O—(CH₂—CH₂O)₃](EtO)₂Si(CH₂)₃Hal,
[(C₇H₁₅O—(CH₂—CH₂O)₄](EtO)₂Si(CH₂)₃Hal,
[(C₇H₁₅O—(CH₂—CH₂O)₅](EtO)₂Si(CH₂)₃Hal,
[(C₇H₁₅O—(CH₂—CH₂O)₆](EtO)₂Si(CH₂)₃Hal,
[(C₈H₁₇O—(CH₂—CH₂O)₂](EtO)₂Si(CH₂)₃Hal,
[(C₈H₁₇O—(CH₂—CH₂O)₃](EtO)₂Si(CH₂)₃Hal,
[(C₈H₁₇O—(CH₂—CH₂O)₄](EtO)₂Si(CH₂)₃Hal,
[(C₈H₁₇O—(CH₂—CH₂O)₅](EtO)₂Si(CH₂)₃Hal,
[(C₈H₁₇O—(CH₂—CH₂O)₆](EtO)₂Si(CH₂)₃Hal,
[(C₉H₁₉O—(CH₂—CH₂O)₂](EtO)₂Si(CH₂)₃Hal,
[(C₉H₁₉O—(CH₂—CH₂O)₃](EtO)₂Si(CH₂)₃Hal,
[(C₉H₁₉O—(CH₂—CH₂O)₄](EtO)₂Si(CH₂)₃Hal,
[(C₉H₁₉O—(CH₂—CH₂O)₅](EtO)₂Si(CH₂)₃Hal,
[(C₉H₁₉O—(CH₂—CH₂O)₆](EtO)₂Si(CH₂)₃Hal,
[(C₁₀H₂₁O—(CH₂—CH₂O)₂](EtO)₂Si(CH₂)₃Hal,
[(C₁₀H₂₁O—(CH₂—CH₂O)₃](EtO)₂Si(CH₂)₃Hal,
[(C₁₀H₂₁O—(CH₂—CH₂O)₄](EtO)₂Si(CH₂)₃Hal,
[(C₁₀H₂₁O—(CH₂—CH₂O)₅](EtO)₂Si(CH₂)₃Hal,
[(C₁₀H₂₁O—(CH₂—CH₂O)₆](EtO)₂Si(CH₂)₃Hal,
[(C₁₁H₂₃O—(CH₂—CH₂O)₂](EtO)₂Si(CH₂)₃Hal,
[(C₁₁H₂₃O—(CH₂—CH₂O)₃](EtO)₂Si(CH₂)₃Hal,
[(C₁₁H₂₃O—(CH₂—CH₂O)₄](EtO)₂Si(CH₂)₃Hal,
[(C₁₁H₂₃O—(CH₂—CH₂O)₅](EtO)₂Si(CH₂)₃Hal,
[(C₁₁H₂₃O—(CH₂—CH₂O)₆](EtO)₂Si(CH₂)₃Hal,
[(C₁₂H₂₅O—(CH₂—CH₂O)₂](EtO)₂Si(CH₂)₃Hal,
[(C₁₂H₂₅O—(CH₂—CH₂O)₃](EtO)₂Si(CH₂)₃Hal,
[(C₁₂H₂₅O—(CH₂—CH₂O)₄](EtO)₂Si(CH₂)₃Hal,
[(C₁₂H₂₅O—(CH₂—CH₂O)₅](EtO)₂Si(CH₂)₃Hal,
[(C₁₂H₂₅O—(CH₂—CH₂O)₆](EtO)₂Si(CH₂)₃Hal,
[(C₁₃H₂₇O—(CH₂—CH₂O)₂](EtO)₂Si(CH₂)₃Hal,
[(C₁₃H₂₇O—(CH₂—CH₂O)₃](EtO)₂Si(CH₂)₃Hal,
[(C₁₃H₂₇O—(CH₂—CH₂O)₄](EtO)₂Si(CH₂)₃Hal,
[(C₁₃H₂₇O—(CH₂—CH₂O)₅](EtO)₂Si(CH₂)₃Hal,
[(C₁₃H₂₇O—(CH₂—CH₂O)₆](EtO)₂Si(CH₂)₃Hal,
[(C₁₄H₂₉O—(CH₂—CH₂O)₂](EtO)₂Si(CH₂)₃Hal,
[(C₁₄H₂₉O—(CH₂—CH₂O)₃](EtO)₂Si(CH₂)₃Hal,
[(C₁₄H₂₉O—(CH₂—CH₂O)₄](EtO)₂Si(CH₂)₃Hal,
[(C₁₄H₂₉O—(CH₂—CH₂O)₅](EtO)₂Si(CH₂)₃Hal,
[(C₁₄H₂₉O—(CH₂—CH₂O)₆](EtO)₂Si(CH₂)₃Hal,
[(C₁₆H₃₃O—(CH₂—CH₂O)₂](EtO)₂Si(CH₂)₃Hal,
[(C₁₆H₃₃O—(CH₂—CH₂O)₃](EtO)₂Si(CH₂)₃Hal,
[(C₁₆H₃₃O—(CH₂—CH₂O)₄](EtO)₂Si(CH₂)₃Hal,
[(C₁₆H₃₃O—(CH₂—CH₂O)₅](EtO)₂Si(CH₂)₃Hal,
[(C₁₆H₃₃O—(CH₂—CH₂O)₆](EtO)₂Si(CH₂)₃Hal,
[(C₁₇H₃₅O—(CH₂—CH₂O)₂](EtO)₂Si(CH₂)₃Hal,
[(C₁₇H₃₅O—(CH₂—CH₂O)₃](EtO)₂Si(CH₂)₃Hal,
[(C₁₇H₃₅O—(CH₂—CH₂O)₄](EtO)₂Si(CH₂)₃Hal,
[(C₁₇H₃₅O—(CH₂—CH₂O)₅](EtO)₂Si(CH₂)₃Hal,
[(C₁₇H₃₅O—(CH₂—CH₂O)₆](EtO)₂Si(CH₂)₃Hal,
[(C₁₈H₃₇O—(CH₂—CH₂O)₂](EtO)₂Si(CH₂)₃Hal,
[(C₁₈H₃₇O—(CH₂—CH₂O)₃](EtO)₂Si(CH₂)₃Hal,
[(C₁₈H₃₇O—(CH₂—CH₂O)₄](EtO)₂Si(CH₂)₃Hal,
[(C₁₈H₃₇O—(CH₂—CH₂O)₅](EtO)₂Si(CH₂)₃Hal,
[(C₁₈H₃₇O—(CH₂—CH₂O)₆](EtO)₂Si(CH₂)₃Hal,
[(C₇H₁₅O—(CH₂—CH₂O)₂]₂(EtO)Si(CH₂)₃Hal,
[(C₇H₁₅O—(CH₂—CH₂O)₃]₂(EtO)Si(CH₂)₃Hal,
[(C₇H₁₅O—(CH₂—CH₂O)₄]₂(EtO)Si(CH₂)₃Hal,
[(C₇H₁₅O—(CH₂—CH₂O)₅]₂(EtO)Si(CH₂)₃Hal,
[(C₇H₁₅O—(CH₂—CH₂O)₆]₂(EtO)Si(CH₂)₃Hal,
[(C₈H₁₇O—(CH₂—CH₂O)₂]₂(EtO)Si(CH₂)₃Hal,
[(C₈H₁₇O—(CH₂—CH₂O)₃]₂(EtO)Si(CH₂)₃Hal,
[(C₈H₁₇O—(CH₂—CH₂O)₄]₂(EtO)Si(CH₂)₃Hal,
[(C₈H₁₇O—(CH₂—CH₂O)₅]₂(EtO)Si(CH₂)₃Hal,
[(C₈H₁₇O—(CH₂—CH₂O)₆]₂(EtO)Si(CH₂)₃Hal,
[(C₉H₁₉O—(CH₂—CH₂O)₂]₂(EtO)Si(CH₂)₃Hal,
[(C₉H₁₉O—(CH₂—CH₂O)₃]₂(EtO)Si(CH₂)₃Hal,
[(C₉H₁₉O—(CH₂—CH₂O)₄]₂(EtO)Si(CH₂)₃Hal,
[(C₉H₁₉O—(CH₂—CH₂O)₅]₂(EtO)Si(CH₂)₃Hal,
[(C₉H₁₉O—(CH₂—CH₂O)₆]₂(EtO)Si(CH₂)₃Hal,
[(C₁₂H₂₅O—(CH₂—CH₂O)₂]₂(EtO)Si(CH₂)₃Hal,
[(C₁₂H₂₅O—(CH₂—CH₂O)₃]₂(EtO)Si(CH₂)₃Hal,
[(C₁₂H₂₅O—(CH₂—CH₂O)₄]₂(EtO)Si(CH₂)₃Hal,
[(C₁₂H₂₅O—(CH₂—CH₂O)₅]₂(EtO)Si(CH₂)₃Hal,
[(C₁₂H₂₅O—(CH₂—CH₂O)₆]₂(EtO)Si(CH₂)₃Hal,
[(C₁₃H₂₇O—(CH₂—CH₂O)₂]₂(EtO)Si(CH₂)₃Hal,
[(C₁₃H₂₇O—(CH₂—CH₂O)₃]₂(EtO)Si(CH₂)₃Hal,

[(C₁₃H₂₇O—(CH₂—CH₂O)₄]₂(EtO)Si(CH₂)₃Hal,
[(C₁₃H₂₇O—(CH₂—CH₂O)₅]₂(EtO)Si(CH₂)₃Hal,
[(C₁₃H₂₇O—(CH₂—CH₂O)₆]₂(EtO)Si(CH₂)₃Hal,
[(C₁₄H₂₉O—(CH₂—CH₂O)₂]₂(EtO)Si(CH₂)₃Hal,
[(C₁₄H₂₉O—(CH₂—CH₂O)₃]₂(EtO)Si(CH₂)₃Hal,
[(C₁₄H₂₉O—(CH₂—CH₂O)₄]₂(EtO)Si(CH₂)₃Hal,
[(C₁₄H₂₉O—(CH₂—CH₂O)₅]₂(EtO)Si(CH₂)₃Hal,
[(C₁₄H₂₉O—(CH₂—CH₂O)₆]₂(EtO)Si(CH₂)₃Hal,
[(C₁₆H₃₃O—(CH₂—CH₂O)₂]₂(EtO)Si(CH₂)₃Hal,
[(C₁₆H₃₃O—(CH₂—CH₂O)₃]₂(EtO)Si(CH₂)₃Hal,
[(C₁₆H₃₃O—(CH₂—CH₂O)₄]₂(EtO)Si(CH₂)₃Hal,
[(C₁₆H₃₃O—(CH₂—CH₂O)₅]₂(EtO)Si(CH₂)₃Hal,
[(C₁₆H₃₃O—(CH₂—CH₂O)₆]₂(EtO)Si(CH₂)₃Hal,
[(C₁₇H₃₅O—(CH₂—CH₂O)₂]₂(EtO)Si(CH₂)₃Hal,
[(C₁₇H₃₅O—(CH₂—CH₂O)₃]₂(EtO)Si(CH₂)₃Hal,
[(C₁₇H₃₅O—(CH₂—CH₂O)₄]₂(EtO)Si(CH₂)₃Hal,
[(C₁₇H₃₅O—(CH₂—CH₂O)₅]₂(EtO)Si(CH₂)₃Hal,
[(C₁₇H₃₅O—(CH₂—CH₂O)₆]₂(EtO)Si(CH₂)₃Hal,
[(C₁₈H₃₇O—(CH₂—CH₂O)₂]₂(EtO)Si(CH₂)₃Hal,
[(C₁₈H₃₇O—(CH₂—CH₂O)₃]₂(EtO)Si(CH₂)₃Hal,
[(C₁₈H₃₇O—(CH₂—CH₂O)₄]₂(EtO)Si(CH₂)₃Hal,
[(C₁₈H₃₇O—(CH₂—CH₂O)₅]₂(EtO)Si(CH₂)₃Hal,
[(C₁₈H₃₇O—(CH₂—CH₂O)₆]₂(EtO)Si(CH₂)₃Hal,
[(C₇H₁₅O—(CH₂—CH₂O)₂]₃Si(CH₂)₃Hal, [(C₇H₁₅O—(CH₂—CH₂O)₃]₃Si(CH₂)₃Hal, [(C₇H₁₅O—(CH₂—CH₂O)₄]₃Si(CH₂)₃Hal, [(C₇H₁₅O—(CH₂—CH₂O)₅]₃Si(CH₂)₃Hal, [(C₇H₁₅O—(CH₂—CH₂O)₆]₃Si(CH₂)₃Hal,
[(C₈H₁₇O—(CH₂—CH₂O)₂]₃Si(CH₂)₃Hal, [(C₈H₁₇O—(CH₂—CH₂O)₃]₃Si(CH₂)₃Hal, [(C₈H₁₇O—(CH₂—CH₂O)₄]₃Si(CH₂)₃Hal, [(C₈H₁₇O—(CH₂—CH₂O)₅]₃Si(CH₂)₃Hal, [(C₈H₁₇O—(CH₂—CH₂O)₆]₃Si(CH₂)₃Hal,
[(C₉H₁₉O—(CH₂—CH₂O)₂]₃Si(CH₂)₃Hal, [(C₉H₁₉O—(CH₂—CH₂O)₃]₃Si(CH₂)₃Hal, [(C₉H₁₉O—(CH₂—CH₂O)₄]₃Si(CH₂)₃Hal, [(C₉H₁₉O—(CH₂—CH₂O)₅]₃Si(CH₂)₃Hal, [(C₉H₁₉O—(CH₂—CH₂O)₆]₃Si(CH₂)₃Hal,
[(C₁₀H₂₁O—(CH₂—CH₂O)₂]₃Si(CH₂)₃Hal, [(C₁₀H₂₁O—(CH₂—CH₂O)₃]₃Si(CH₂)₃Hal, [(C₁₀H₂₁O—(CH₂—CH₂O)₄]₃Si(CH₂)₃Hal, [(C₁₀H₂₁O—(CH₂—CH₂O)₅]₃Si(CH₂)₃Hal, [(C₁₀H₂₁O—(CH₂—CH₂O)₆]₃Si(CH₂)₃Hal,
[(C₁₂H₂₅O—(CH₂—CH₂O)₂]₃Si(CH₂)₃Hal, [(C₁₂H₂₅O—(CH₂—CH₂O)₃]₃Si(CH₂)₃Hal, [(C₁₂H₂₅O—(CH₂—CH₂O)₄]₃Si(CH₂)₃Hal, [(C₁₂H₂₅O—(CH₂—CH₂O)₅]₃Si(CH₂)₃Hal, [(C₁₂H₂₅O—(CH₂—CH₂O)₆]₃Si(CH₂)₃Hal,
[(C₁₃H₂₇O—(CH₂—CH₂O)₂]₃Si(CH₂)₃Hal, [(C₁₃H₂₇O—(CH₂—CH₂O)₃]₃Si(CH₂)₃Hal, [(C₁₃H₂₇O—(CH₂—CH₂O)₄]₃Si(CH₂)₃Hal, [(C₁₃H₂₇O—(CH₂—CH₂O)₅]₃Si(CH₂)₃Hal, [(C₁₃H₂₇O—(CH₂—CH₂O)₆]₃Si(CH₂)₃Hal,
[(C₁₄H₂₉O—(CH₂—CH₂O)₂]₃Si(CH₂)₃Hal, [(C₁₄H₂₉O—(CH₂—CH₂O)₃]₃Si(CH₂)₃Hal, [(C₁₄H₂₉O—(CH₂—CH₂O)₄]₃Si(CH₂)₃Hal, [(C₁₄H₂₉O—(CH₂—CH₂O)]₃Si(CH₂)₃Hal, [(C₁₄H₂₉O—(CH₂—CH₂O)₆]₃Si(CH₂)₃Hal,
[(C₁₅H₃₁O—(CH₂—CH₂O)₂]₃Si(CH₂)₃Hal, [(C₁₅H₃₁O—(CH₂—CH₂O)₃]₃Si(CH₂)₃Hal, [(C₁₅H₃₁O—(CH₂—CH₂O)₄]₃Si(CH₂)₃Hal, [(C₁₅H₃₁O—(CH₂—CH₂O)₅]₃Si(CH₂)₃Hal, [(C₁₅H₃₁O—(CH₂—CH₂O)₆]₃Si(CH₂)₃Hal,
[(C₁₆H₃₃O—(CH₂—CH₂O)₂]₃Si(CH₂)₃Hal, [(C₁₆H₃₃O—(CH₂—CH₂O)₃]₃Si(CH₂)₃Hal, [(C₁₆H₃₃O—(CH₂—CH₂O)₄]₃Si(CH₂)₃Hal, [(C₁₆H₃₃O—(CH₂—CH₂O)₅]₃Si(CH₂)₃Hal, [(C₁₆H₃₃O—(CH₂—CH₂O)₆]₃Si(CH₂)₃Hal,
[(C₁₈H₃₇O—(CH₂—CH₂O)₂]₃Si(CH₂)₃Hal, [(C₁₈H₃₇O—(CH₂—CH₂O)₃]₃Si(CH₂)₃Hal, [(C₁₈H₃₇O—(CH₂—CH₂O)₄]₃Si(CH₂)₃Hal, [(C₁₈H₃₇O—(CH₂—CH₂O)₅]₃Si(CH₂)₃Hal, or [(C₁₈H₃₇O—(CH₂—CH₂O)₆]₃Si(CH₂)₃Hal, where the alkyl moieties (Alk) can be unbranched or branched.

Compounds of the formula I where Alk=$C_7H_{15}$, $C_8H_{17}$, $C_9H_{19}$, $C_{10}H_{21}$, $C_{11}H_{23}$, $C_{12}H_{25}$, $C_{13}H_{27}$, $C_{14}H_{29}$, $C_{15}H_{31}$, $C_{16}H_{33}$, $C_{17}H_{35}$, $C_{18}H_{37}$, $C_{19}H_{39}$, or $C_{20}H_{41}$ can be:
[(Alk-O—(CH₂—CH(CH₃)O—)₂](MeO)₂Si(CH₂)₃Hal,
[(Alk-O—(CH₂—CH(CH₃)O—)₃](MeO)₂Si(CH₂)₃Hal,
[(Alk-O—(CH₂—CH(CH₃)O—)₄](MeO)₂Si(CH₂)₃Hal,
[(Alk-O—(CH₂—CH(CH₃)O—)₅](MeO)₂Si(CH₂)₃Hal,
[(Alk-O—(CH₂—CH(CH₃)O—)₆](MeO)₂Si(CH₂)₃Hal,
[(Alk-O—(CH₂—CH(CH₃)O—)₇](MeO)₂Si(CH₂)₃Hal,
[(Alk-O—(CH₂—CH(CH₃)O—)₈](MeO)₂Si(CH₂)₃Hal,
[(Alk-O—(CH₂—CH(CH₃)O—)₉](MeO)₂Si(CH₂)₃Hal,
[(Alk-O—(CH₂—CH(CH₃)O—)₁₀](MeO)₂Si(CH₂)₃Hal,
[(Alk-O—(CH₂—CH(CH₃)O—)₁₁](MeO)₂Si(CH₂)₃Hal,
[(Alk-O—(CH₂—CH(CH₃)O—)₁₂](MeO)₂Si(CH₂)₃Hal,
[(Alk-O—(CH₂—CH(CH₃)O—)₁₃](MeO)₂Si(CH₂)₃Hal,
[(Alk-O—(CH₂—CH(CH₃)O—)₁₄](MeO)₂Si(CH₂)₃Hal,
[(Alk-O—(CH₂—CH(CH₃)—O—)₁₅](MeO)₂Si(CH₂)₃Hal, [(Alk-O—(CH₂—CH(CH₃)O—)₁₆](MeO)₂Si(CH₂)₃Hal, [(Alk-O—(CH₂—CH(CH₃)O—)₁₇](MeO)₂Si(CH₂)₃Hal, [(Alk-O—(CH₂—CH(CH₃)O—)₁₈](MeO)₂Si(CH₂)₃Hal, [(Alk-O—(CH₂—CH(CH₃)O—)₁₉](MeO)₂Si(CH₂)₃Hal, [(Alk-O—(CH₂—CH(CH₃)O—)₂₀](MeO)₂Si(CH₂)₃Hal,
[(Alk-O—(CH₂—CH(CH₃)O—)₂]₂(MeO)Si(CH₂)₃Hal,
[(Alk-O—(CH₂—CH(CH₃)O—)₃]₂ (MeO)Si(CH₂)₃Hal,
[(Alk-O—(CH₂—CH(CH₃)O—)₄]₂ (MeO)Si(CH₂)₃Hal,
[(Alk-O—(CH₂—CH(CH₃)O—)₅]₂(MeO)Si(CH₂)₃Hal,
[(Alk-O—(CH₂—CH(CH₃)O—)₆]₂ (MeO)Si(CH₂)₃Hal,
[(Alk-O—(CH₂—CH(CH₃)O—)₇]₂ (MeO)Si(CH₂)₃Hal,
[(Alk-O—(CH₂—CH(CH₃)O—)₈]₂ (MeO)Si(CH₂)₃Hal,
[(Alk-O—(CH₂—CH(CH₃)O—)₉]₂ (MeO)Si(CH₂)₃Hal,
[(Alk-O—(CH₂—CH(CH₃)O—)₁₀]₂(MeO)Si(CH₂)₃Hal,
[(Alk-O—(CH₂—CH(CH₃)O—)₁₁]₂ (MeO)Si(CH₂)₃Hal,
[(Alk-O—(CH₂—CH(CH₃)O—)₁₂]₂ (MeO)Si(CH₂)₃Hal,
[(Alk-O—(CH₂—CH(CH₃)O—)₁₃]₂ (MeO)Si(CH₂)₃Hal,
[(Alk-O—(CH₂—CH(CH₃)O—)₁₄]₂ (MeO)Si(CH₂)₃Hal,
[(Alk-O—(CH₂—CH(CH₃)O—)₁₅]₂(MeO)Si(CH₂)₃Hal,
[(Alk-O—(CH₂—CH(CH₃)O—)₁₆]₂ (MeO)Si(CH₂)₃Hal,
[(Alk-O—(CH₂—CH(CH₃)O—)₁₇]₂ (MeO)Si(CH₂)₃Hal,
[(Alk-O—(CH₂—CH(CH₃)O—)₁₈]₂ (MeO)Si(CH₂)₃Hal,
[(Alk-O—(CH₂—CH(CH₃)O—)₁₉]₂ (MeO)Si(CH₂)₃Hal,
[(Alk-O—(CH₂—CH(CH₃)O—)₂₀]₂(MeO)Si(CH₂)₃Hal,
[(Alk-O—(CH₂—CH(CH₃)O—)₂](Me)(MeO)Si(CH₂)₃Hal, [(Alk-O—(CH₂—CH(CH₃)O—)₃](Me)(MeO)Si(CH₂)₃Hal, [(Alk-O—(CH₂—CH(CH₃)O—)₄](Me)(MeO)Si(CH₂)₃Hal, [(Alk-O—(CH₂—CH(CH₃)O—)₅](Me)(MeO)Si(CH₂)₃Hal, [(Alk-O—(CH₂—CH(CH₃)O—)₆](Me)(MeO)Si(CH₂)₃Hal, [(Alk-O—(CH₂—CH(CH₃)O—)₇](Me)(MeO)Si(CH₂)₃Hal, [(Alk-O—(CH₂—CH(CH₃)O—)₈](Me)(MeO)Si(CH₂)₃Hal, [(Alk-O—(CH₂—CH(CH₃)O—)₉](Me)(MeO)Si(CH₂)₃Hal, [(Alk-O—(CH₂—CH(CH₃)O—)₁₀](Me)(MeO)Si(CH₂)₃Hal, [(Alk-O—(CH₂—CH(CH₃)O—)₁₁](Me)(MeO)Si(CH₂)₃Hal, [(Alk-O—(CH₂—CH(CH₃)O—)₁₂](Me)(MeO)Si(CH₂)₃Hal, [(Alk-O—(CH₂—CH(CH₃)O—)₁₃](Me)(MeO)Si(CH₂)₃Hal, [(Alk-O—(CH₂—CH(CH₃)O—)₁₄](Me)(MeO)Si(CH₂)₃Hal, [(Alk-O—(CH₂—CH(CH₃)O—)₁₋₅](Me)(MeO)Si(CH₂)₃Hal, [(Alk-O—(CH₂—CH(CH₃)O—)₁₆](Me)(MeO)Si(CH₂)₃Hal, [(Alk-O—(CH₂—CH(CH₃)O—)₁₇](Me)(MeO)Si(CH₂)₃Hal, [(Alk-O—(CH₂—CH(CH₃)O—)₁₈](Me)(MeO)Si(CH₂)₃Hal, [(Alk-O—(CH₂—CH(CH₃)O—)₁₉](Me)(MeO)Si(CH₂)₃Hal, [(Alk-O—(CH₂—CH(CH₃)O—)₂₀](Me)(MeO)Si(CH₂)₃Hal,
[(Alk-O—(CH₂—CH(CH₃)O—)₂](EtO)₂Si(CH₂)₃Hal,
[(Alk-O—(CH₂—CH(CH₃)O—)₃](EtO)₂Si(CH₂)₃Hal,
[(Alk-O—(CH₂—CH(CH₃)O—)₄](EtO)₂Si(CH₂)₃Hal,

[(Alk-O—(CH$_2$—CH(CH$_3$)O—)$_5$](EtO)$_2$Si(CH$_2$)$_3$Hal,
[(Alk-O—(CH$_2$—CH(CH$_3$)O—)$_6$](EtO)$_2$Si(CH$_2$)$_3$Hal,
[(Alk-O—(CH$_2$—CH(CH$_3$)O—)$_7$](EtO)$_2$Si(CH$_2$)$_3$Hal,
[(Alk-O—(CH$_2$—CH(CH$_3$)O—)$_8$](EtO)$_2$Si(CH$_2$)$_3$Hal,
[(Alk-O—(CH$_2$—CH(CH$_3$)O—)$_9$](EtO)$_2$Si(CH$_2$)$_3$Hal,
[(Alk-O—(CH$_2$—CH(CH$_3$)O—)$_{10}$](EtO)$_2$Si(CH$_2$)$_3$Hal,
[(Alk-O—(CH$_2$—CH(CH$_3$)O—)$_{11}$](EtO)$_2$Si(CH$_2$)$_3$Hal,
[(Alk-O—(CH$_2$—CH(CH$_3$)O—)$_{12}$](EtO)$_2$Si(CH$_2$)$_3$Hal,
[(Alk-O—(CH$_2$—CH(CH$_3$)O—)$_{13}$](EtO)$_2$Si(CH$_2$)$_3$Hal,
[(Alk-O—(CH$_2$—CH(CH$_3$)O—)$_{14}$](EtO)$_2$Si(CH$_2$)$_3$Hal,
[(Alk-O—(CH$_2$—CH(CH$_3$)O—)$_{1\text{-}5}$](EtO)$_2$Si(CH$_2$)$_3$Hal,
[(Alk-O—(CH$_2$—CH(CH$_3$)O—)$_{16}$](EtO)$_2$Si(CH$_2$)$_3$Hal,
[(Alk-O—(CH$_2$—CH(CH$_3$)O—)$_{17}$](EtO)$_2$Si(CH$_2$)$_3$Hal,
[(Alk-O—(CH$_2$—CH(CH$_3$)O—)$_{18}$](EtO)$_2$Si(CH$_2$)$_3$Hal,
[(Alk-O—(CH$_2$—CH(CH$_3$)O—)$_{19}$](EtO)$_2$Si(CH$_2$)$_3$Hal,
[(Alk-O—(CH$_2$—CH(CH$_3$)O—)$_{20}$](EtO)$_2$Si(CH$_2$)$_3$Hal,

[(Alk-O—(CH$_2$—CH(CH$_3$)O—)$_2$]$_2$(EtO)Si(CH$_2$)$_3$Hal,
[(Alk-O—(CH$_2$—CH(CH$_3$)O—)$_3$]$_2$(EtO)Si(CH$_2$)$_3$Hal,
[(Alk-O—(CH$_2$—CH(CH$_3$)O—)$_4$]$_2$(EtO)Si(CH$_2$)$_3$Hal,
[(Alk-O—(CH$_2$—CH(CH$_3$)O—)$_5$]$_2$(EtO)Si(CH$_2$)$_3$Hal,
[(Alk-O—(CH$_2$—CH(CH$_3$)O—)$_6$]$_2$(EtO)Si(CH$_2$)$_3$Hal,
[(Alk-O—(CH$_2$—CH(CH$_3$)O—)$_7$]$_2$(EtO)Si(CH$_2$)$_3$Hal,
[(Alk-O—(CH$_2$—CH(CH$_3$)O—)$_8$]$_2$(EtO)Si(CH$_2$)$_3$Hal,
[(Alk-O—(CH$_2$—CH(CH$_3$)O—)$_9$]$_2$(EtO)Si(CH$_2$)$_3$Hal,
[(Alk-O—(CH$_2$—CH(CH$_3$)O—)$_{12}$]$_2$(EtO)Si(CH$_2$)$_3$Hal,
[(Alk-O—(CH$_2$—CH(CH$_3$)O—)$_{11}$]$_2$(EtO)Si(CH$_2$)$_3$Hal,
[(Alk-O—(CH$_2$—CH(CH$_3$)O—)$_{12}$]$_2$(EtO)Si(CH$_2$)$_3$Hal,
[(Alk-O—(CH$_2$—CH(CH$_3$)O—)$_{13}$]$_2$(EtO)Si(CH$_2$)$_3$Hal,
[(Alk-O—(CH$_2$—CH(CH$_3$)O—)$_{14}$]$_2$(EtO)Si(CH$_2$)$_3$Hal,
[(Alk-O—(CH$_2$—CH(CH$_3$)O—)$_{15}$]$_2$(EtO)Si(CH$_2$)$_3$Hal,
[(Alk-O—(CH$_2$—CH(CH$_3$)O—)$_{16}$]$_2$(EtO)Si(CH$_2$)$_3$Hal,
[(Alk-O—(CH$_2$—CH(CH$_3$)O—)$_{17}$]$_2$(EtO)Si(CH$_2$)$_3$Hal,
[(Alk-O—(CH$_2$—CH(CH$_3$)O—)$_{18}$]$_2$(EtO)Si(CH$_2$)$_3$Hal,
[(Alk-O—(CH$_2$—CH(CH$_3$)O—)$_{19}$]$_2$(EtO)Si(CH$_2$)$_3$Hal,
[(Alk-O—(CH$_2$—CH(CH$_3$)O—)$_{20}$]$_2$(EtO)Si(CH$_2$)$_3$Hal,

[(Alk-O—(CH$_2$—CH(CH$_3$)O—)$_2$](Me)(EtO)Si(CH$_2$)$_3$Hal,
[(Alk-O—(CH$_2$—CH(CH$_3$)O—)$_3$](Me)(EtO)Si(CH$_2$)$_3$Hal, [(Alk-O—(CH$_2$—CH(CH$_3$)O—)$_4$](Me)(EtO)Si(CH$_2$)$_3$Hal, [(Alk-O—(CH$_2$—CH(CH$_3$)O—)$_5$](Me)(EtO)Si(CH$_2$)$_3$Hal, [(Alk-O—(CH$_2$—CH(CH$_3$)O—)$_6$](Me)(EtO)Si(CH$_2$)$_3$Hal, [(Alk-O—(CH$_2$—CH(CH$_3$)O—)$_7$](Me)(EtO)Si(CH$_2$)$_3$Hal, [(Alk-O—(CH$_2$—CH(CH$_3$)O—)$_8$](Me)(EtO)Si(CH$_2$)$_3$Hal, [(Alk-O—(CH$_2$—CH(CH$_3$)O—)$_9$](Me)(EtO)Si(CH$_2$)$_3$Hal, [(Alk-O—(CH$_2$—CH(CH$_3$)O—)$_{10}$](Me)(EtO)Si(CH$_2$)$_3$Hal, [(Alk-O—(CH$_2$—CH(CH$_3$)O—)$_{11}$](Me)(EtO)Si(CH$_2$)$_3$Hal, [(Alk-O—(CH$_2$—CH(CH$_3$)O—)$_{12}$](Me)(EtO)Si(CH$_2$)$_3$Hal, [(Alk-O—(CH$_2$—CH(CH$_3$)O—)$_{13}$](Me)(EtO)Si(CH$_2$)$_3$Hal, [(Alk-O—(CH$_2$—CH(CH$_3$)O—)$_{14}$](Me)(EtO)Si(CH$_2$)$_3$Hal, [(Alk-O—(CH$_2$—CH(CH$_3$)O—)$_{15}$](Me)(EtO)Si(CH$_2$)$_3$Hal, [(Alk-O—(CH$_2$—CH(CH$_3$)O—)$_{16}$](Me)(EtO)Si(CH$_2$)$_3$Hal, [(Alk-O—(CH$_2$—CH(CH$_3$)O—)$_{17}$](Me)(EtO)Si(CH$_2$)$_3$Hal, [(Alk-O—(CH$_2$—CH(CH$_3$)O—)$_{18}$](Me)(EtO)Si(CH$_2$)$_3$Hal, [(Alk-O—(CH$_2$—CH(CH$_3$)O—)$_{19}$](Me)(EtO)Si(CH$_2$)$_3$Hal, [(Alk-O—(CH$_2$—CH(CH$_3$)O—)$_{20}$](Me)(EtO)Si(CH$_2$)$_3$Hal,

[(Alk-O—(CH$_2$—CH(CH$_3$)O—)$_2$]$_2$(Me)Si(CH$_2$)$_3$Hal,
[(Alk-O—(CH$_2$—CH(CH$_3$)O—)$_3$]$_2$(Me)Si(CH$_2$)$_3$Hal,
[(Alk-O—(CH$_2$—CH(CH$_3$)O—)$_4$]$_2$(Me)Si(CH$_2$)$_3$Hal,
[(Alk-O—(CH$_2$—CH(CH$_3$)O—)$_5$]$_2$(Me)Si(CH$_2$)$_3$Hal,
[(Alk-O—(CH$_2$—CH(CH$_3$)O—)$_6$]$_2$(Me)Si(CH$_2$)$_3$Hal,
[(Alk-O—(CH$_2$—CH(CH$_3$)O—)$_7$]$_2$(Me)Si(CH$_2$)$_3$Hal,
[(Alk-O—(CH$_2$—CH(CH$_3$)O—)$_8$]$_2$(Me)Si(CH$_2$)$_3$Hal,
[(Alk-O—(CH$_2$—CH(CH$_3$)O—)$_9$]$_2$(Me)Si(CH$_2$)$_3$Hal,
[(Alk-O—(CH$_2$—CH(CH$_3$)O—)$_{12}$]$_2$(Me)Si(CH$_2$)$_3$Hal,
[(Alk-O—(CH$_2$—CH(CH$_3$)O—)$_{11}$]$_2$(Me)Si(CH$_2$)$_3$Hal,
[(Alk-O—(CH$_2$—CH(CH$_3$)O—)$_{12}$]$_2$(Me)Si(CH$_2$)$_3$Hal,
[(Alk-O—(CH$_2$—CH(CH$_3$)O—)$_{13}$]$_2$(Me)Si(CH$_2$)$_3$Hal,
[(Alk-O—(CH$_2$—CH(CH$_3$)O—)$_{14}$]$_2$(Me)Si(CH$_2$)$_3$Hal,
[(Alk-O—(CH$_2$—CH(CH$_3$)O—)$_{15}$]$_2$(Me)Si(CH$_2$)$_3$Hal,
[(Alk-O—(CH$_2$—CH(CH$_3$)O—)$_{16}$]$_2$(Me)Si(CH$_2$)$_3$Hal,
[(Alk-O—(CH$_2$—CH(CH$_3$)O—)$_{17}$]$_2$(Me)Si(CH$_2$)$_3$Hal,
[(Alk-O—(CH$_2$—CH(CH$_3$)O—)$_{18}$]$_2$(Me)Si(CH$_2$)$_3$Hal,
[(Alk-O—(CH$_2$—CH(CH$_3$)O—)$_{19}$]$_2$(Me)Si(CH$_2$)$_3$Hal,
[(Alk-O—(CH$_2$—CH(CH$_3$)O—)$_{20}$]$_2$(Me)Si(CH$_2$)$_3$Hal,

[(Alk-O—(CH$_2$—CH(CH$_3$)O—)$_2$](Me)$_2$Si(CH$_2$)$_3$Hal,
[(Alk-O—(CH$_2$—CH(CH$_3$)O—)$_3$](Me)$_2$Si(CH$_2$)$_3$Hal,
[(Alk-O—(CH$_2$—CH(CH$_3$)O—)$_4$](Me)$_2$Si(CH$_2$)$_3$Hal,
[(Alk-O—(CH$_2$—CH(CH$_3$)O—)$_5$](Me)$_2$Si(CH$_2$)$_3$Hal,
[(Alk-O—(CH$_2$—CH(CH$_3$)O—)$_6$](Me)$_2$Si(CH$_2$)$_3$Hal,
[(Alk-O—(CH$_2$—CH(CH$_3$)O—)$_7$](Me)$_2$Si(CH$_2$)$_3$Hal,
[(Alk-O—(CH$_2$—CH(CH$_3$)O—)$_8$](Me)$_2$Si(CH$_2$)$_3$Hal,
[(Alk-O—(CH$_2$—CH(CH$_3$)O—)$_9$](Me)$_2$Si(CH$_2$)$_3$Hal,
[(Alk-O—(CH$_2$—CH(CH$_3$)O—)$_{10}$](Me)$_2$Si(CH$_2$)$_3$Hal,
[(Alk-O—(CH$_2$—CH(CH$_3$)O—)$_{11}$](Me)$_2$Si(CH$_2$)$_3$Hal,
[(Alk-O—(CH$_2$—CH(CH$_3$)O—)$_{12}$](Me)$_2$Si(CH$_2$)$_3$Hal,
[(Alk-O—(CH$_2$—CH(CH$_3$)O—)$_{13}$](Me)$_2$Si(CH$_2$)$_3$Hal,
[(Alk-O—(CH$_2$—CH(CH$_3$)O—)$_{14}$](Me)$_2$Si(CH$_2$)$_3$Hal,
[(Alk-O—(CH$_2$—CH(CH$_3$)O—)$_{15}$](Me)$_2$Si(CH$_2$)$_3$Hal,
[(Alk-O—(CH$_2$—CH(CH$_3$)O—)$_{16}$](Me)$_2$Si(CH$_2$)$_3$Hal,
[(Alk-O—(CH$_2$—CH(CH$_3$)O—)$_{17}$](Me)$_2$Si(CH$_2$)$_3$Hal,
[(Alk-O—(CH$_2$—CH(CH$_3$)O—)$_{18}$](Me)$_2$Si(CH$_2$)$_3$Hal,
[(Alk-O—(CH$_2$—CH(CH$_3$)O—)$_{19}$](Me)$_2$Si(CH$_2$)$_3$Hal,
or [(Alk-O—(CH$_2$—CH(CH$_3$)O—)$_{20}$](Me)$_2$Si(CH$_2$)$_3$Hal, where the groups Alk can be unbranched or branched.

The rubber mixtures of the invention can use (haloorganyl)alkylpolyethersilanes of the general formula I or else mixtures composed of compounds of the general formula I.

The rubber mixtures of the invention can use, as (haloorganyl)alkylpolyethersilanes, hydrolyzates, oligomeric or polymeric siloxanes, and condensates of the compounds of the general formula I.

The (halo-organyl)alkylpolyethersilanes of the formula I can either be added in pure form to the mixing process or else added in a form absorbed onto an inert organic or inorganic carrier, or else a form prereacted with an organic or inorganic carrier. Preferred carrier materials can be precipitated or fumed silicas, waxes, thermoplastics, natural or synthetic silicates, natural or synthetic oxides, such as aluminum oxide, or carbon blacks. The (halo-organyl)alkylpolyethersilanes of the formula I can also be added to the mixing process in a form prereacted with the filler to be used.

Preferred waxes can be waxes with melting points, melting ranges, or softening ranges from 50° to 200° C., preferably from 70° to 180° C., particularly preferably from 90° to 150° C., very particularly preferably from 100° to 120° C.

The waxes used can be olefinic waxes.

The waxes used can contain saturated and unsaturated hydrocarbon chains.

The waxes used can comprise polymers or oligomers, preferably emulsion SBR or/and solution SBR.

The waxes used can comprise long-chain alkanes or/and long-chain carboxylic acids.

The waxes used can comprise ethylene-vinyl acetate and/or polyvinyl alcohols.

The (halo-organyl)alkylpolyethersilanes of the formula I can be added to the mixing process in a form physically mixed with an organic substance, or physically mixed with an organic substance mixture.

The organic substance or the organic substance mixture can comprise polymers or oligomers.

Polymers or oligomers can be heteroatom-containing polymers or oligomers, for example ethylene-vinyl alcohol or/and polyvinyl alcohols.

Polymers or oligomers can be saturated or unsaturated elastomers, preferably emulsion SBR or/and solution SBR.

The melting point, melting range, or softening range of the mixture composed of (halo-organyl)alkylpolyether-silanes of the formula I and of organic substance or of an organic substance mixture can be from 50 to 200° C., preferably from 70 to 180° C., particularly preferably from 70 to 150° C., very particularly preferably from 70 to 130° C., extremely preferably from 90 to 110° C.

The following oxidic fillers can be used for the rubber mixtures of the invention:
- Amorphous silicas, prepared by way of example via precipitation of solutions of silicates (precipitated silicas) or flame hydrolysis of silicon halides (fumed silicas). The specific surface areas of the amorphous silicas can be from 5 to 1000 m$^2$/g, preferably from 20 to 400 m$^2$/g (BET surface area) and their primary particle sizes can be from 10 to 400 nm. The silicas can, if appropriate, also take the form of mixed oxides with other metal oxides, such as Al oxides, Mg oxides, Ca oxides, Ba oxides, Zn oxides and titanium oxides.
- Synthetic silicates, such as aluminum silicate or alkaline earth metal silicates, such as magnesium silicate or calcium silicate. The BET surface areas of the synthetic silicates can be from 20 to 400 m$^2$/g and their primary particle diameters can be from 10 to 400 nm.
- Synthetic or natural aluminum oxides and synthetic or natural aluminum hydroxides.
- Natural silicates, such as kaolin and other naturally occurring silicas.
- Glass fiber and glass fiber products (mats, strands) or glass microbeads.

It may be preferable to use amorphous silicas prepared via precipitation of solutions of silicates (precipitated silicas) with BET surface areas of from 20 to 400 m$^2$/g. The amounts that can be used of the amorphous silicas are from 5 to 150 parts by weight, based in each case on 100 parts of rubber (phr).

The fillers mentioned can be used alone or in a mixture. In one particularly preferred embodiment, the rubber mixtures can comprise from 10 to 150 parts by weight of oxidic fillers, if appropriate together with from 0 to 100 parts by weight of carbon black, and also from 1 to 20 parts by weight of (haloorganyl)alkylpolyethersilane of the formula I, based in each case on 100 parts by weight of rubber.

Additional fillers that can be used are carbon blacks, such as flame black, furnace black, gas black, or thermal black, or synthetic or natural calcium carbonates, such as precipitated calcium carbonate. The BET surface area of the carbon blacks can be from 20 to 200 m$^2$/g. The carbon blacks can, if appropriate, also contain heteroatoms, such as Si.

Suitable materials for preparation of the inventive rubber mixtures are not only natural rubber but also synthetic rubbers. Preferred synthetic rubbers are described by way of example in W. Hofmann, Kautschuktechnologie [Rubber technology], Genter Verlag, Stuttgart 1980. They comprise, inter alia
- polybutadiene (BR);
- polyisoprene (IR);
- styrene-butadiene copolymers (SBR), such as emulsion SBR (E-SBR) or solution SBR (S-SBR). The styrene-butadiene copolymers can have styrene content of from 1 to 60% by weight, preferably from 2 to 50% by weight, particularly preferably from 10 to 40% by weight, very particularly preferably from 15 to 35% by weight;
- chloroprene (CR);
- isobutylene-isoprene copolymers (IIR);
- butadiene-acrylonitrile copolymers whose acrylonitrile contents are from 5 to 60% by weight, preferably from 10 to 50% by weight (NBR), particularly preferably from 10 to 45% by weight (NBR), very particularly preferably from 19 to 45% by weight (NBR);
- partially hydrogenated or fully hydrogenated NBR rubber (HNBR);
- ethylene-propylene-diene copolymers (EPDM);
- abovementioned rubbers which also have functional groups, e.g. carboxy groups, silanol groups or epoxy groups, e.g. epoxidized NR, carboxy-functionalized NBR or silanol- (—SiOH) or silyl-alkoxy-functionalized (—Si—OR) SBR;

or a mixture of these rubbers. Anionically polymerized S-SBR rubbers (solution SBR) whose glass transition temperature is above −50° C. and their mixtures with diene rubbers may be of particular interest for production of car tire treads.

The inventive rubber mixtures can comprise other rubber auxiliaries, such as reaction accelerators, antioxidants, heat stabilizers, light stabilizers, anti-ozonants, processing aids, plasticizers, tackifiers, blowing agents, dyes, pigments, waxes, extenders, organic acids, retarders, metal oxides, and also activators, such as triethanolamine or hexanetriol.

Other rubber auxiliaries can be:
polyethylene glycol or/and polypropylene glycol or/and polybutylene glycol with molar masses from 50 to 50 000 g/mol, preferably from 50 to 20 000 g/mol, particularly preferably from 200 to 10 000 g/mol, very particularly preferably from 400 to 6000 g/mol, extremely preferably from 500 to 3000 g/mol, hydrocarbon-terminated polyethylene glycol Alk$^I$-O—(CH$_2$—CH$_2$—O)$_{y'}$—H or Alk$^I$-(CH$_2$—CH$_2$—O)$_{y'}$-Alk$^I$, hydrocarbon-terminated polypropylene glycol Alk$^I$-O—(CH$_2$—CH(CH$_3$)—O)$_{y'}$—H or Alk-O—(CH$_2$—CH(CH$_3$)—O)$_{y'}$-Alk$^I$, hydrocarbon-terminated polybutylene glycol Alk$^I$, —O—(CH$_2$—CH$_2$—CH$_2$—CH$_2$—O)$_{y'}$, —H, Alk$^I$-O—(CH$_2$—CH(CH$_3$)—CH$_2$—O)$_{yI}$—H, Alk$^I$-O—(CH$_2$—CH$_2$—CH$_2$—CH$_2$—O)$_{y'}$-Alk$^I$ or Alk$^I$-O—(CH$_2$—CH(CH$_3$)—CH$_2$—O)$_{y'}$-Alk$^I$, where the average of y$^I$ is from 2 to 25, preferably from 2 to 15, particularly preferably from 3 to 8 and from 10 to 14, very particularly preferably from 3 to 6 and from 10 to 13, and Alk$^I$ is a branched or unbranched, unsubstituted or substituted, saturated or unsaturated hydrocarbon having from 1 to 35, preferably from 4 to 25, particularly preferably from 6 to 20, very particularly preferably from 10 to 20, extremely preferably from 11 to 14, carbon atoms, neopentyl glycol HO—CH$_2$—C(Me)$_2$—CH$_2$—OH, pentaerythritol C(CH$_2$—OH)$_4$ or trimethylolpropane CH$_3$—CH$_2$—C(CH$_2$—OH)$_3$ etherified with polyethylene glycol, etherified with polypropylene glycol, etherified with polybutylene glycol, or etherified with a mixture thereof, where the number of repeat units of ethylene glycol, propylene glycol or/and butylene glycol in the etherified polyalcohols can be from 2 to 100, preferably from 2 to 50, particularly preferably from 3 to 30, very particularly preferably from 3 to 15.

To calculate the average of y$^I$, the analytically determinable amount of polyalkylene glycol units can be divided by the analytically determinable amount of -Alk$^I$ [(amount of polyalkylene glycol units)/(amount of -Alk$^I$)]. By way of example, $^1$H and $^{13}$C nuclear resonance spectroscopy can be used to determine the amounts.

The rubber mixture of the invention can comprise further silanes.

Further silanes that can be added to the rubber mixtures of the invention are mercapto-organylsilanes containing ethoxysilyl groups,
or/and thiocyanato-organylsilanes containing ethoxy-silyl groups,
or/and blocked mercapto-organylsilanes containing ethoxysilyl groups,
or/and polysulfidic alkoxysilanes containing ethoxysilyl groups.

Further silanes that can be added to the rubber mixtures of the invention are mercapto-organylsilanes containing tri-ethoxysilyl groups,
or/and thiocyanato-organylsilanes containing tri-ethoxysilyl groups,
or/and blocked mercapto-organylsilanes containing triethoxysilyl groups,
or/and polysulfidic alkoxysilanes containing triethoxy-silyl groups.

Further silanes that can be added to the rubber mixtures of the invention are mercapto-organyl(alkoxy-silanes) having C$_8$H$_{17}$—O—, C$_{10}$H$_{21}$—O—, C$_{12}$H$_{25}$—O—, C$_{14}$H$_{29}$—O—, C$_{16}$H$_{33}$—O—, or C$_{18}$H$_{37}$—O— groups on silicon.

Further silanes that can be added to the rubber mixtures of the invention are thiocyanato-organyl(alkoxysilanes) having C$_8$H$_{17}$—O—, C$_{10}$H$_{21}$—O—, C$_{12}$H$_{25}$—O—, C$_{14}$H$_{29}$—O—, C$_{16}$H$_{33}$—O—, or C$_{18}$H$_{37}$—O— groups on silicon.

Further silanes that can be added to the rubber mixtures of the invention are blocked mercapto-organyl(alkoxysilanes) having C$_8$H$_{17}$—O—, C$_{10}$H$_{21}$—O—, C$_{12}$H$_{25}$—O—, C$_{14}$H$_{29}$—O—, C$_{16}$H$_{33}$—O—, or C$_{18}$H$_{37}$—O— groups on silicon.

Further silanes that can be added to the rubber mixtures of the invention are blocked mercapto-organyl(alkoxysilanes) having difunctional alcohols (diols) on silicon (e.g. NXT LowV or NXT Ultra-LowV from General Electric).

Further silanes that can be added to the rubber mixtures of the invention are polysulfidic alkoxy-silanes having C$_8$H$_{17}$—O—, C$_{10}$H$_{21}$—O—, C$_{12}$H$_{25}$—O—, C$_{14}$H$_{29}$—O—, C$_{16}$H$_{33}$—O—, or C$_{18}$H$_{37}$—O— groups on silicon.

Further silanes that can be added to the rubber mixtures of the invention are polysulfidic alkoxy-silanes of the formulae EtO—Si(Me)$_2$-CH$_2$—CH$_2$—CH$_2$—S$_2$—CH$_2$—CH$_2$—CH$_2$—Si(Me)$_2$(OEt) EtO—Si(Me)$_2$-CH$_2$—CH$_2$—CH$_2$—S$_3$—CH$_2$—CH$_2$—CH$_2$—Si(Me)$_2$(OEt), or EtO—Si(Me)$_2$-CH$_2$—CH$_2$—CH$_2$—S$_4$—CH$_2$—CH$_2$—CH$_2$—Si(Me)$_2$(OEt).

Further silanes that can be added to the rubber mixtures of the invention are 3-mercaptopropyl(tri-ethoxysilane) (for example Si 263 from Degussa AG), 3-thiocyanatopropyl(triethoxysilane) (for example Si 264 from Degussa AG), bis(triethoxysilylpropyl) polysulfide (for example Si 69 from Degussa AG), bis(triethoxysilylpropyl) disulfide (for example Si 266 from Degussa AG).

Further silanes that can be added to the rubber mixtures of the invention are alkylpolyether-alcohol-containing mercapto-organylsilanes (such as Si 363 from Degussa AG),
or/and alkylpolyether-alcohol-containing thiocyanato-organylsilanes,
or/and alkylpolyether-alcohol-containing, blocked mercapto-organylsilanes,
or/and alkylpolyether-alcohol-containing, polysulfidic silanes.

The alkylpolyether-alcohol-containing mercapto-organylsilanes can be compounds of the general formula II

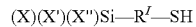    II.

The alkylpolyether-alcohol-containing thiocyanato-organylsilanes can be compounds of the general formula III

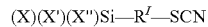    III.

The alkylpolyether-alcohol-containing, blocked mercapto-organylsilanes can be compounds of the general formula IV

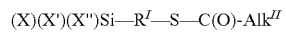    IV, where Alk$^I$ is a branched or unbranched, saturated or unsaturated, substituted or unsubstituted, aliphatic, aromatic, or mixed aliphatic/aromatic monovalent hydrocarbon group, preferably C$_1$-C$_{25}$ hydrocarbon group, particularly preferably C$_2$-C$_{22}$ hydrocarbon group, very particularly preferably C$_7$-C$_{17}$ hydrocarbon group, extremely preferably C$_{11}$-C$_{16}$ hydrocarbon group.

The alkylpolyether-alcohol-containing, polysulfidic silanes can be compounds of the general formula V

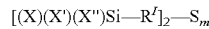    V where m=from 1 to 8.

It can be desirable for reasons of economics or of rubber technology to minimize the necessary or desirable proportion of further silanes.

The amounts used of the rubber auxiliaries can be known amounts, depending inter alia on the intended purpose. As a function of the processing aid used, conventional amounts can be amounts of from 0.001 to 50% by weight, preferably from 0.001 to 30% by weight, particularly preferably from 0.01 to 30% by weight, very particularly preferably from 0.1 to 30% by weight, based on rubber (phr).

The rubber mixtures of the invention can be sulfur-vulcanizable rubber mixtures.

The rubber mixtures of the invention can be peroxidically crosslinkable rubber mixtures.

Crosslinking agents that can be used are sulfur or sulfur-donor substances. The amounts used of sulfur can be from 0.1 to 10% by weight, preferably from 0.1 to 5% by weight, based on rubber.

The (halo-organyl)alkylpolyethersilanes of the formula I can be used as adhesion promoter between inorganic materials (e.g. glass beads, glass splinters, glass surfaces, glass fibers, metals, oxidic fillers, silicas) and organic polymers (e.g. thermosets, thermoplastics, elastomers), or as crosslinking agent and surface modifier for oxidic surfaces. The (halo-organyl)alkylpolyethersilanes of the formula I can be used as coupling reagents in filled rubber mixtures, an example being tire treads.

It can be desirable for reasons of economics or of rubber technology to minimize the necessary or desirable proportion of rubber auxiliaries.

The rubber mixtures of the invention can comprise further vulcanization accelerators.

Amounts that can be used of the vulcanization accelerators are from 0.1 to 10% by weight, preferably from 0.1 to 5% by weight, based on the rubber used.

The rubber mixtures of the invention can comprise
(D) a thiuram sulfide accelerator and/or carbamate accelerator, and/or the corresponding zinc salts,
(E) if appropriate, a nitrogen-containing coactivator,
(F) if appropriate, further rubber auxiliaries, and
(G) if appropriate, further accelerators.

The invention further provides a process for the production of the rubber mixtures of the invention, which is characterized in that the process comprises mixing at least one rubber, at least one oxidic filler, and at least one (halo-organyl)alkylpolyethersilane of the formula (I).

The process of the invention can be carried out at temperatures >25° C.

The process of the invention can be carried out in the temperature range from 80° C. to 200° C., preferably from 100° C. to 180° C., particularly preferably from 110° C. to 160° C.

The process can be carried out continuously or batchwise.

The addition of the (halo-organyl)alkylpolyethersilane of the general formula (I), and also the addition of the fillers, can take place when the temperatures of the composition are from 100 to 200° C. However, it can also take place at lower temperatures of from 40 to 100° C., e.g. together with further rubber auxiliaries.

The blending of the rubbers with the filler and, if appropriate, with rubber auxiliaries and with the (halo-organyl)alkylpolyethersilane of the general formula (I) can take place in or on conventional mixing assemblies, such as rolls, internal mixers, and mixing extruders. These rubber mixtures can usually be produced in internal mixers, beginning with one or more successive thermomechanical mixing stages in which the rubbers, the filler, the (halo-organyl)alkylpolyether-silane of the general formula (I) and the rubber auxiliaries are incorporated by mixing at from 100 to 170° C. The sequence of addition and the juncture of addition of the individual components here can have a decisive effect on the resultant properties of the mixture. The crosslinking chemicals can usually be admixed in an internal mixer or on a roll at from 40 to 110° C. with the rubber mixture thus obtained, and processed to give what is known as a crude mixture for the subsequent steps of the process, for example shaping and vulcanization.

Vulcanization of the rubber mixtures of the invention can take place at temperatures of from 80 to 200° C., preferably from 130 to 180° C., if appropriate under a pressure of from 10 to 200 bar.

The rubber mixtures of the invention can be used for the production of moldings, for example for the production of tires, including pneumatic tires, tire treads, cable sheathing, hoses, drive belts, conveyor belts, roll coverings, shoe soles, and sealing elements, e.g. ring seals, and damping elements.

The invention further provides moldings obtainable from the rubber mixture of the invention, via vulcanization.

The rubber mixtures of the invention have the advantage of high tear strength.

EXAMPLES

The following compounds are used in rubber mixtures:

Compound 1: Bis(triethoxysilylpropyl) disulfide is obtainable as Si 266 from Degussa AG.

Compound 2: VP Si 363, a reaction product of 3-(triethoxysilyl)propanethiol with ethoxylated C13 alcohol, a product from Degussa AG.

Compound 3: 3-octanoylthiopropyl(triethoxysilane), obtainable as NXT from GE-OSi.

Compound 4: $S_{2.15}\{-C_3H_6-Si(OC_2H_5)_2[O-CH_2-CH_2-]_5O-C_{13}H_{27}\}_2$ is prepared by a method based on the process described in DE 102006008670.8-43:

479 g of bis(triethoxysilylpropyl) disulfide (Si 266 from Degussa AG) are mixed in a flask with 848 g of Lutensol TO5 (from BASF AG) and 1 g of Ti (OBu)$_4$. The mixture is heated under reduced pressure to 140° C. in a distillation apparatus. The pressure is reduced within a period of 240 min from 400 mbar to 50 mbar, and the resultant ethanol is removed by distillation.

1230 g of product are isolated. The product is studied by nuclear resonance spectroscopy and corresponds to the formula $S_{2.15}\{-C_3H_6-Si(OC_2H_5)_2[O-CH_2-CH_2-]_5O-C_{13}H_{27}\}_2$.

Compounds for the Comparative Examples

Compound 5: $Cl-CH_2-CH_2-CH_2-Si(OEt)[(O-CH_2-CH_2)_3-OC_4H_9]_2$

Synthesis:

480 g of 3-chloropropyltriethoxysilane (Si 230, Degussa), 825 g of triethylene glycol monobutyl ether, and 1 g of Ti(OBu)$_4$ are used as initial charge in a flask and heated to 130° C., and the resultant ethanol is removed by distillation in vacuo. 1120 g of liquid product are obtained.

Compound 6: $Cl-CH_2-CH_2-CH_2-Si(OEt)[O-CH_2-CH_2-O-CH_3]_2$

Synthesis:

750 g of 3-chloropropyltriethoxysilane (Si 230, Degussa), 474 g of $HO-CH_2-CH_2-O-CH_3$ (methyl glycol), and 1 g of Ti(OBU)$_4$ are used as initial charge in a flask and heated to 130° C., and the resultant ethanol is removed by distillation in vacuo by way of a column. 930 g of liquid product are obtained.

Compounds for the Examples of the Invention

Compound 7: $Cl-CH_2-CH_2-CH_2-Si(OEt)[(O-CH_2-CH_2)_3-O-C_8H_{17}]_2$

Synthesis:

435 g of 3-chloropropyltriethoxysilane (Si 230, Degussa), 950 g of $H-(O-CH_2-CH_2)_3-O-C_8H_{17}$ (Aduxol Hex 03 from Schaerer & Schlaepfer), and 0.6 g of Ti(OBu)$_4$ are used as initial charge in a flask and heated to 128° C., and the resultant ethanol is removed by distillation in vacuo. 1190 g of liquid product are obtained.

Compound 8: $Cl-CH_2-CH_2-CH_2-Si(OEt)[(O-CH_2-CH_2)_3-O-C_{13}H_{27}]_2$

Synthesis:

343 g of 3-chloropropyltriethoxysilane (Si 230, Degussa), 950 g of $H-(O-CH_2-CH_2)_3-O-C_{13}H_{27}$ (Lutensol TO3 from BASF AG), and 0.5 g of Ti(OBu)$_4$ are used as initial charge in a flask and heated to 132° C., and the resultant ethanol is removed by distillation in vacuo. 1155 g of liquid product are obtained.

Compound 9: $Cl-CH_2-CH_2-CH_2-Si(OEt)[(O-CH_2-CH_2)_3-O-C_6H_4-O-C_9H_{19}]_2$

Synthesis:

300 g of 3-chloropropyltriethoxysilane (Si 230, Degussa), 885 g of $H-(O-CH_2-CH_2)_3-O-C_6H_4-O-C_9H_{19}$ (Aduxol AH 3 from Schaerer & Schlaepfer), and 0.3 g of Ti(OBu)$_4$ are used as initial charge in a flask and heated to from 145 to 150° C., and the resultant ethanol is removed by distillation in vacuo. 1038 g of product are isolated.

Example 1

Rubber Mixtures

The main mixing specification used for the rubber mixtures is stated in table 1 below. The phr unit used there is proportions by weight, based on 100 parts of the crude rubber used. The amounts added of compounds 1 to 4 are 8 phr, and the amounts admixed of compounds 5 to 9 are in each case 2 phr. In each case, the first mixture of a series of experiments comprises only one of the compounds 1 to 4.

The general process for the production of rubber mixtures and their vulcanizates is described in the book: "Rubber Technology Handbook", W. Hofmann, Hanser Verlag 1994.

TABLE 1

Main mixing specification

| | Amount added [phr] |
|---|---|
| 1$^{st}$ stage | |
| Buna VSL 5025-1 | 96 |
| Buna CB 24 | 30 |
| Ultrasil 7000 GR | 80 |
| Compounds 1 to 4 | 8 |
| Compounds 5 to 9 | 0 or 2 |
| ZnO | 3 |
| Stearic acid | 2 |
| Naftolen ZD | 10 |
| Vulkanox 4020 | 1.5 |
| Protektor G 3108 | 1 |
| 2$^{nd}$ stage | |
| Batch stage 1 | |
| 3$^{rd}$ stage | |
| Batch stage 2 | |
| Vulkacit D | 1 |
| Vulkacit CZ | 1.5 |
| Perkacit TBzTD | 0.2 |
| Sulfur | 2.1 |

The polymer VSL 5025-1 is a solution-polymerized SBR copolymer from Bayer AG, having styrene content of 25% by weight and butadiene content of 75% by weight. The copolymer comprises 37.5 phr of oil and its Mooney viscosity (ML 1+4/100° C.) is 50.

The polymer Buna CB 24 is a cis-1,4-polybutadiene (neodymium type) from Bayer AG, having cis-1,4 content of at least 96%, its Mooney viscosity being 44±5.

Ultrasil 7000 GR is a readily dispersible silica from Degussa AG, its BET surface area being 170 m$^2$/g.

Naftolen ZD from Chemetall is used as aromatic oil, and Vulkanox 4020 is PPD from Bayer AG, and Protektor G3108 is an ozone-protection wax from Paramelt B.V. Vulkacit CZ (CBS) and Vulkacit D (DPG) are commercially available products from Bayer AG. Perkacit TBZTD (tetrabenzylthiuram tetrasulfide) is a product from Flexsys Nev.

The rubber mixtures are produced in an internal mixer in accordance with the mixing specification in table 2.

TABLE 2

| Stage 1 | |
|---|---|
| Settings | |
| Mixing assembly | Werner & Pfleiderer type E |
| Rotation rate | 70 min$^{-1}$ |
| Ram pressure | 5.5 bar |
| Capacity | 1.58 L |
| Fill level | 0.58 |
| Chamber temp. | 70° C. |
| Mixing procedure | |
| 0 to 1 min | Buna VSL 5025-1 + Buna CB 24 |

TABLE 2-continued

| 1 to 2 min | ½ silica, ZnO, stearic acid, Naftolen ZD, compounds 1 to 9 |
|---|---|
| 2 to 4 min | ½ silica, Vulkanox, Protektor |
| 4 min | Purge |
| 4 to 5 min | Mix |
| 5 min | Aerate |
| 5 to 6 min | Mix and discharge |
| Batch temp. | 145-155° C. |
| Storage | 24 h at room temperature |
| Stage 2 | |
| Settings | |
| Mixing assembly | As in stage 1, except: |
| Rotation rate | 70 min$^{-1}$ |
| Chamber temp. | 80° C. |
| Fill level | 0.56 |
| Mixing procedure | |
| 0 to 2 min | Break up stage 1 batch |
| 2 to 5 min | Maintain 150° C. batch temperature via rotation rate variation |
| 5 min | Discharge |
| Batch temp. | 145-155° C. |
| Storage | 4 h at room temperature |
| Stage 3 | |
| Settings | |
| Mixing assembly | As in stage 1, except: |
| Rotation rate | 40 min$^{-1}$ |
| Fill level | 0.55 |
| Chamber temp. | 50° C. |
| Mixing procedure | |
| 0 to 2 min | Stage 2 batch, accelerator, sulfur |
| 2 min | Discharge and form sheet on laboratory mixing rolls (diameter 200 mm, length 450 mm, chamber temperature 50° C.) Homogenization: Cut the material 5 times towards the left and 5 times towards the right and 6 times with wide nip (6 mm) and 3 times with narrow nip (3 mm), and peel milled sheet away. |
| Batch temp. | <110° C. |

Table 3 collates the methods for rubber testing.

TABLE 3

| Physical testing | Standard/conditions |
|---|---|
| ML 1 + 4, 100° C., 3$^{rd}$ stage | DIN 53523/3, ISO 667 |
| Shore A hardness, 23° C. (SH) | DIN 53 505 |
| Tear strength DIE B | ASTM D 624 |

Example 1a

Example 1a uses 8 phr of compound 1 in all of the mixtures. In addition to this, mixtures 2 to 6 use compounds 5 to 9 as in table 4.

TABLE 4

| Amount added [phr] | Mixture 1 Reference | Mixture 2 Reference | Mixture 3 Reference | Mixture 4 | Mixture 5 | Mixture 6 |
|---|---|---|---|---|---|---|
| 1$^{st}$ stage | | | | | | |
| Buna VSL 5025-1 | 96 | 96 | 96 | 96 | 96 | 96 |
| Buna CB 24 | 30 | 30 | 30 | 30 | 30 | 30 |
| Ultrasil 7000 GR | 80 | 80 | 80 | 80 | 80 | 80 |
| Compound 1 | 8 | 8 | 8 | 8 | 8 | 8 |
| Compound 5 | — | 2 | — | — | — | — |
| Compound 6 | — | — | 2 | — | — | — |
| Compound 7 | — | — | — | 2 | — | — |
| Compound 8 | — | — | — | — | 2 | — |
| Compound 9 | — | — | — | — | — | 2 |
| ZnO | 3 | 3 | 3 | 3 | 3 | 3 |
| Stearic acid | 2 | 2 | 2 | 2 | 2 | 2 |
| Naftolen ZD | 10 | 10 | 10 | 10 | 10 | 10 |
| Vulkanox 4020 | 1.5 | 1.5 | 1.5 | 1.5 | 1.5 | 1.5 |
| Protektor G 3108 | 1 | 1 | 1 | 1 | 1 | 1 |
| 2$^{nd}$ stage | | | | | | |
| Batch stage 1 | | | | | | |
| 3$^{rd}$ stage | | | | | | |
| Batch stage 2 | | | | | | |
| Vulkacit D | 1 | 1 | 1 | 1 | 1 | 1 |
| Vulkacit CZ | 1.5 | 1.5 | 1.5 | 1.5 | 1.5 | 1.5 |
| Perkacit TBzTD | 0.2 | 0.2 | 0.2 | 0.2 | 0.2 | 0.2 |
| Sulfur | 2.1 | 2.1 | 2.1 | 2.1 | 2.1 | 2.1 |

Table 5 shows the results of vulcanizate testing.

TABLE 5

| | Unit | Mixture 1 | Mixture 2 | Mixture 3 | Mixture 4 | Mixture 5 | Mixture 6 |
|---|---|---|---|---|---|---|---|
| ML 1 + 4, 3$^{rd}$ stage | [—] | 60 | 59 | 57 | 56 | 57 | 57 |
| Shore A hardness | [—] | 63 | 64 | 63 | 63 | 63 | 62 |
| Tear strength DIE B | [N/mm] | 26.5 | 27.5 | 28.5 | 69.4 | 31.6 | 29.6 |

As can be seen from the data in table 5, a feature of rubber mixtures 4 to 6 is improved tear strength in comparison with the two comparative examples mixture 2 and 3 and the mixture without addition of the (halo-organyl)alkylpolyethersilane, mixture 1. The viscosities of the crude mixtures and the hardnesses of the vulcanizates here are comparable.

Example 1b

By analogy with example 1a, compound 2 has now been combined with compounds 5 to 9. Here again, the first mixture (mixture 7) has no addition of any second compound (see table 6).

TABLE 6

| Amount added [phr] | Mixture 7 Reference | Mixture 8 Reference | Mixture 9 Reference | Mixture 10 | Mixture 11 | Mixture 12 |
|---|---|---|---|---|---|---|
| 1$^{st}$ stage | | | | | | |
| Buna VSL 5025-1 | 96 | 96 | 96 | 96 | 96 | 96 |
| Buna CB 24 | 30 | 30 | 30 | 30 | 30 | 30 |
| Ultrasil 7000 GR | 80 | 80 | 80 | 80 | 80 | 80 |
| Compound 2 | 8 | 8 | 8 | 8 | 8 | 8 |
| Compound 5 | — | 2 | — | — | — | — |
| Compound 6 | — | — | 2 | — | — | — |
| Compound 7 | — | — | — | 2 | — | — |
| Compound 8 | — | — | — | — | 2 | — |
| Compound 9 | — | — | — | — | — | 2 |
| ZnO | 3 | 3 | 3 | 3 | 3 | 3 |
| Stearic acid | 2 | 2 | 2 | 2 | 2 | 2 |
| Naftolen ZD | 10 | 10 | 10 | 10 | 10 | 10 |
| Vulkanox 4020 | 1.5 | 1.5 | 1.5 | 1.5 | 1.5 | 1.5 |
| Protektor G 3108 | 1 | 1 | 1 | 1 | 1 | 1 |
| 2$^{nd}$ stage | | | | | | |
| Batch stage 1 | | | | | | |
| 3$^{rd}$ stage | | | | | | |
| Batch stage 2 | | | | | | |
| Vulkacit D | 1 | 1 | 1 | 1 | 1 | 1 |
| Vulkacit CZ | 1.5 | 1.5 | 1.5 | 1.5 | 1.5 | 1.5 |
| Perkacit TBzTD | 0.2 | 0.2 | 0.2 | 0.2 | 0.2 | 0.2 |
| Sulfur | 2.1 | 2.1 | 2.1 | 2.1 | 2.1 | 2.1 |

Table 7 collates the vulcanizate data.

TABLE 7

| | Unit | Mixture 7 | Mixture 8 | Mixture 9 | Mixture 10 | Mixture 11 | Mixture 12 |
|---|---|---|---|---|---|---|---|
| ML 1 + 4, 3$^{rd}$ stage | [—] | 57 | 59 | 56 | 56 | 56 | 56 |
| Shore A hardness | [—] | 55 | 54 | 55 | 55 | 54 | 54 |
| Tear strength DIE B | [N/mm] | 32.8 | 32.7 | 27.8 | 34.6 | 34.2 | 34.4 |

Here again, the conclusion is the same as in example 1a. Mixtures 10 to 12 of the invention have better tear strength than the comparative examples mixtures 8 and 9 and than mixture 7, which comprises only compound 2.

Example 1c

This example uses a combination with compound 3 as in table 8.

TABLE 8

| Amount added [phr] | Mixture 13 Reference | Mixture 14 Reference | Mixture 15 Reference | Mixture 16 |
|---|---|---|---|---|
| 1$^{st}$ stage | | | | |
| Buna VSL 5025-1 | 96 | 96 | 96 | 96 |
| Buna CB 24 | 30 | 30 | 30 | 30 |
| Ultrasil 7000 GR | 80 | 80 | 80 | 80 |
| Compound 3 | 8 | 8 | 8 | 8 |
| Compound 5 | — | 2 | — | — |
| Compound 6 | — | — | 2 | — |
| Compound 9 | — | — | — | 2 |
| ZnO | 3 | 3 | 3 | 3 |
| Stearic acid | 2 | 2 | 2 | 2 |
| Naftolen ZD | 10 | 10 | 10 | 10 |
| Vulkanox 4020 | 1.5 | 1.5 | 1.5 | 1.5 |
| Protektor G 3108 | 1 | 1 | 1 | 1 |
| 2$^{nd}$ stage | | | | |
| Batch stage 1 | | | | |

TABLE 8-continued

| Amount added [phr] | Mixture 13 Reference | Mixture 14 Reference | Mixture 15 Reference | Mixture 16 |
|---|---|---|---|---|
| 3rd stage | | | | |
| Batch stage 2 | | | | |
| Vulkacit D | 1 | 1 | 1 | 1 |
| Vulkacit CZ | 1.5 | 1.5 | 1.5 | 1.5 |
| Perkacit TBzTD | 0.2 | 0.2 | 0.2 | 0.2 |
| Sulfur | 2.1 | 2.1 | 2.1 | 2.1 |

Table 9 collates the results.

TABLE 9

| | Unit | Mixture 13 | Mixture 14 | Mixture 15 | Mixture 16 |
|---|---|---|---|---|---|
| ML 1 + 4, 3rd stage | [—] | 62 | 61 | 59 | 59 |
| Shore A hardness | [—] | 61 | 62 | 61 | 60 |
| Tear strength DIE B | [N/mm] | 35.5 | 37.0 | 33.1 | 40.9 |

Here again, tear strength is highest for mixture 16 of the invention.

Example 1d

This example uses a combination with compound 4 as in table 10.

TABLE 10

| Amount added [phr] | Mixture 17 Reference | Mixture 18 Reference | Mixture 19 Reference | Mixture 20 | Mixture 21 |
|---|---|---|---|---|---|
| 1st stage | | | | | |
| Buna VSL 5025-1 | 96 | 96 | 96 | 96 | 96 |
| Buna CB 24 | 30 | 30 | 30 | 30 | 30 |
| Ultrasil 7000 GR | 80 | 80 | 80 | 80 | 80 |
| Compound 4 | 8 | 8 | 8 | 8 | 8 |
| Compound 5 | — | 2 | — | — | — |
| Compound 6 | — | — | 2 | — | — |
| Compound 8 | — | — | — | 2 | — |
| Compound 9 | — | — | — | — | 2 |
| ZnO | 3 | 3 | 3 | 3 | 3 |
| Stearic acid | 2 | 2 | 2 | 2 | 2 |
| Naftolen ZD | 10 | 10 | 10 | 10 | 10 |
| Vulkanox 4020 | 1.5 | 1.5 | 1.5 | 1.5 | 1.5 |
| Protektor G 3108 | 1 | 1 | 1 | 1 | 1 |
| 2nd stage | | | | | |
| Batch stage 1 | | | | | |
| 3rd stage | | | | | |
| Batch stage 2 | | | | | |
| Vulkacit D | 1 | 1 | 1 | 1 | 1 |
| Vulkacit CZ | 1.5 | 1.5 | 1.5 | 1.5 | 1.5 |
| Perkacit TBzTD | 0.2 | 0.2 | 0.2 | 0.2 | 0.2 |
| Sulfur | 2.1 | 2.1 | 2.1 | 2.1 | 2.1 |

Table 11 collates the results.

TABLE 7

| | Unit | Mixture 17 | Mixture 18 | Mixture 19 | Mixture 20 | Mixture 21 |
|---|---|---|---|---|---|---|
| ML 1 + 4, 3rd stage | [—] | 57 | 65 | 54 | 55 | 54 |
| Shore A hardness | [—] | 58 | 59 | 59 | 59 | 57 |
| Tear strength DIE B | [N/mm] | 38.1 | 38.1 | 37.3 | 44.2 | 42.7 |

Here again, tear strengths are highest for the two mixtures 20 and 21 of the invention.

What is claimed is:

1. A rubber mixture, comprising:
   a) at least one rubber,
   b) at least one oxidic filler, and
   c) at least one (halo-organyl)alkylpolyethersilane of formula (I):

$$(X)(X')(X'')Si-R^I-Hal \qquad (I),$$

wherein Hal is F, Cl, Br, or I;
   X is an alkylpolyether group O—$((CR^{II}_2)_w$—O—$)_t$Alk, where $R^{II}$, independently of one another, are H, a phenyl group, or an alkyl group,
   w is a number from 2 to 20,
   t is a number from 2 to 20,
   Alk is a branched or unbranched, saturated or unsaturated, substituted or unsubstituted, aliphatic, aromatic, or mixed aliphatic/aromatic monovalent hydrocarbon group having more than 6 carbon atoms,
   X' is a branched or unbranched alkyl, branched or unbranched alkoxy, branched or unbranched $C_2$-$C_{25}$ alkenyloxy, $C_6$-$C_{35}$ aryloxy, a branched or unbranched $C_7$-$C_{35}$ alkylaryloxy group, a branched or unbranched $C_7$-$C_{35}$ aralkyloxy group, or is X;
   X" is a branched or unbranched alkyl, branched or unbranched alkoxy, branched or unbranched $C_2$-$C_{25}$ alkenyloxy, $C_6$-$C_{35}$ aryloxy, a branched or unbranched $C_7$-$C_{35}$ alkylaryloxy group, a branched or unbranched $C_7$-$C_{35}$ aralkyloxy group, or X;
   $R^I$ is a branched or unbranched, saturated or unsaturated, aliphatic, aromatic, or mixed aliphatic/aromatic divalent $C_1$-$C_{30}$ hydrocarbon group, optionally substituted.

2. The rubber mixture of claim 1, wherein w is from 2 to 15 and t is from 3 to 17.

3. The rubber mixture of claim 1, wherein w is from 2 to 10 and t is from 4 to 10.

4. The rubber mixture of claim 1, wherein Alk is a $C_7$-$C_{25}$ hydrocarbon group.

5. The rubber mixture of claim 1, wherein Alk is a $C_{11}$-$C_{16}$ hydrocarbon group.

6. The rubber mixture of claim 1, wherein X' is selected from the group consisting of: —OCH$_3$, —OCH$_2$—CH$_3$, —OCH(CH$_3$)—CH$_3$, —OCH$_2$—CH$_2$—CH$_3$, —OC$_9$H$_{19}$, —OC$_{10}$H$_{21}$, —OC$_{11}$H$_{23}$, —OC$_{12}$H$_{25}$, —OC$_{13}$H$_{27}$, —OC$_{14}$H$_{29}$, —OC$_{15}$H$_{31}$, —OC$_{16}$H$_{33}$, —OC$_{17}$H$_{35}$, and —OC$_{18}$H$_{37}$.

7. The rubber mixture of claim 1, wherein X' is selected from the group consisting of: a $C_6$-$C_{18}$ alkenyloxy, a phenyloxy (—OC$_6$H$_5$), a $C_9$-$C_{18}$ aryloxy, —O—CH$_2$—C$_6$H$_5$), and —O—CH$_2$—CH$_2$—C$_6$H$_5$.

8. The rubber mixture of claim 1, wherein X" is selected from the group consisting of: —CH$_3$, —CH$_2$—CH$_3$, —CH(CH$_3$)—CH$_3$, —CH$_2$—CH$_2$—CH$_3$, C$_4$-C$_{18}$-alkyl, —OCH$_3$, —OCH$_2$—CH$_3$, —OCH(CH$_3$)—CH$_3$, —OCH$_2$—CH$_2$—CH$_3$, —OC$_9$H$_{19}$, —OC$_{10}$H$_{21}$, —OC$_{11}$H$_{23}$, —OC$_{12}$H$_{25}$, —OC$_{13}$H$_{27}$, —OC$_{14}$H$_{29}$, —OC$_{15}$H$_{31}$, —OC$_{16}$H$_{33}$, —OC$_{17}$H$_{35}$, or —OC$_{18}$H$_{37}$, a C$_6$-C$_{18}$ alkenyloxy, phenyloxy, a C$_9$-C$_{18}$ aryloxy, —O—CH$_2$—C$_6$H$_5$, and —O—CH$_2$—CH$_2$—C$_6$H$_5$.

9. The rubber mixture of claim 1, wherein the group (CR$^{II}_2$)$_w$ is selected from the group consisting of: —CH$_2$—CH$_2$—, —CH$_2$—CH(CH$_3$)—, —CH(CH$_3$)—CH$_2$—, —CH$_2$—CH$_2$—CH$_2$—CH$_2$—, —CH$_2$—CH(—CH$_2$—CH$_3$)—, —CH$_2$—CH(—CH=CH$_2$)—, —CH$_2$—CH$_2$—CH$_2$—CH$_2$—CH$_2$—, —CH$_2$—CH$_2$—CH$_2$—CH$_2$—CH$_2$—CH$_2$—, and —CH(C$_6$H$_5$)—CH$_2$—, or —CH$_2$—CH(C$_6$H$_5$)—.

10. The rubber mixture of claim 1, wherein R$^I$ is selected from the group consisting of:

—CH$_2$—, —CH$_2$CH$_2$—, —CH$_2$CH$_2$CH$_2$—, —CH$_2$CH$_2$CH$_2$CH$_2$—, —CH(CH$_3$)—, —CH$_2$CH(CH$_3$)—, —CH(CH$_3$)CH$_2$—, —C(CH$_3$)$_2$—, —CH(C$_2$H$_5$)—, —CH$_2$CH$_2$CH(CH$_3$)—, —CH$_2$(CH$_3$)CH$_2$CH$_2$—, —CH$_2$CH(CH$_3$)CH$_2$—, —CH$_2$CH$_2$CH$_2$CH$_2$CH$_2$—, —CH$_2$CH$_2$CH$_2$CH$_2$CH$_2$CH$_2$—, —CH$_2$CH$_2$CH$_2$CH$_2$CH$_2$CH$_2$CH$_2$—, —CH$_2$CH$_2$CH$_2$CH$_2$CH$_2$CH$_2$CH$_2$CH$_2$—, —CH$_2$CH$_2$CH$_2$CH$_2$CH$_2$CH$_2$CH$_2$CH$_2$CH$_2$—, —CH$_2$CH$_2$CH$_2$CH$_2$CH$_2$CH$_2$CH$_2$CH$_2$CH$_2$CH$_2$—, —CH$_2$CH$_2$CH$_2$CH$_2$CH$_2$CH$_2$CH$_2$CH$_2$CH$_2$CH$_2$CH$_2$CH$_2$—, —CH$_2$CH$_2$CH$_2$CH$_2$CH$_2$CH$_2$CH$_2$CH$_2$CH$_2$CH$_2$CH$_2$CH$_2$CH$_2$CH$_2$—, —CH$_2$CH$_2$CH$_2$CH$_2$CH$_2$CH$_2$CH$_2$CH$_2$CH$_2$CH$_2$CH$_2$CH$_2$CH$_2$CH$_2$CH$_2$CH$_2$—, —CH$_2$CH$_2$CH$_2$CH$_2$CH$_2$CH$_2$CH$_2$CH$_2$CH$_2$CH$_2$CH$_2$CH$_2$CH$_2$CH$_2$CH$_2$CH$_2$CH$_2$CH$_2$—, and

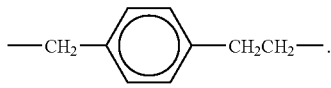

11. The rubber mixture if claim 1, wherein said alkylpolyether group is O—(CR$^{II}_2$—CR$^{II}_2$—CR$^{II}_2$—O)$_t$-Alk, O—(CR$^{II}_2$—CR$^{II}_2$—CR$^{II}_2$—CR$^{II}_2$—O)$_t$-Alk, or O—(CR$^{II}_2$—CR$^{II}_2$—CR$^{II}_2$—CR$^{II}_2$—CR$^{II}_2$—O)$_t$-Alk.

12. The rubber mixture of claim 11, wherein Alk is a C$_{11}$-C$_{16}$ hydrocarbon group.

13. The rubber mixture of claim 1, wherein said (Haloorganyl)alkylpolyether-silane of formula I is selected from the group consisting of:

[(C$_7$H$_{15}$O—(CH$_2$—CH$_2$O)$_2$](Me)$_2$Si(CH$_2$)$_3$Hal,
[(C$_7$H$_{15}$O—(CH$_2$—CH$_2$O)$_3$](Me)$_2$Si(CH$_2$)$_3$Hal,
[(C$_7$H$_{15}$O—(CH$_2$—CH$_2$O)$_4$](Me)$_2$Si(CH$_2$)$_3$Hal,
[(C$_7$H$_{15}$O—(CH$_2$—CH$_2$O)$_5$](Me)$_2$Si(CH$_2$)$_3$Hal,
[(C$_7$H$_{15}$O—(CH$_2$—CH$_2$O)$_6$](Me)$_2$Si(CH$_2$)$_3$Hal,
[(C$_8$H$_{17}$O—(CH$_2$—CH$_2$O)$_2$](Me)$_2$Si(CH$_2$)$_3$Hal,
[(C$_8$H$_{17}$O—(CH$_2$—CH$_2$O)$_3$](Me)$_2$Si(CH$_2$)$_3$Hal,
[(C$_8$H$_{17}$O—(CH$_2$—CH$_2$O)$_4$](Me)$_2$Si(CH$_2$)$_3$Hal,
[(C$_8$H$_{17}$O—(CH$_2$—CH$_2$O)$_5$](Me)$_2$Si(CH$_2$)$_3$Hal,
[(C$_8$H$_{17}$O—(CH$_2$—CH$_2$O)$_6$](Me)$_2$Si(CH$_2$)$_3$Hal,
[(C$_9$H$_{19}$O—(CH$_2$—CH$_2$O)$_2$](Me)$_2$Si(CH$_2$)$_3$Hal,
[(C$_9$H$_{19}$O—(CH$_2$—CH$_2$O)$_3$](Me)$_2$Si(CH$_2$)$_3$Hal,
[(C$_9$H$_{19}$O—(CH$_2$—CH$_2$O)$_4$](Me)$_2$Si(CH$_2$)$_3$Hal,
[(C$_9$H$_{19}$O—(CH$_2$—CH$_2$O)$_5$](Me)$_2$Si(CH$_2$)$_3$Hal,
[(C$_9$H$_{19}$O—(CH$_2$—CH$_2$O)$_6$](Me)$_2$Si(CH$_2$)$_3$Hal,
[(C$_7$H$_{15}$O—(CH$_2$—CH$_2$O)$_2$]$_2$(Me)Si(CH$_2$)$_3$Hal,
[(C$_7$H$_{15}$O—(CH$_2$—CH$_2$O)$_3$]$_2$(Me)Si(CH$_2$)$_3$Hal,
[(C$_7$H$_{15}$O—(CH$_2$—CH$_2$O)$_4$]$_2$(Me)Si(CH$_2$)$_3$Hal,
[(C$_7$H$_{15}$O—(CH$_2$—CH$_2$O)$_5$]$_2$(Me)Si(CH$_2$)$_3$Hal,
[(C$_7$H$_{15}$O—(CH$_2$—CH$_2$O)$_6$]$_2$(Me)Si(CH$_2$)$_3$Hal,
[(C$_8$H$_{17}$O—(CH$_2$—CH$_2$O)$_2$]$_2$(Me)Si(CH$_2$)$_3$Hal,
[(C$_8$H$_{17}$O—(CH$_2$—CH$_2$O)$_3$]$_2$(Me)Si(CH$_2$)$_3$Hal,
[(C$_8$H$_{17}$O—(CH$_2$—CH$_2$O)$_4$]$_2$(Me)Si(CH$_2$)$_3$Hal,
[(C$_8$H$_{17}$O—(CH$_2$—CH$_2$O)$_5$]$_2$(Me)Si(CH$_2$)$_3$Hal,
[(C$_8$H$_{17}$O—(CH$_2$—CH$_2$O)$_6$]$_2$(Me)Si(CH$_2$)$_3$Hal,
[(C$_9$H$_{19}$O—(CH$_2$—CH$_2$O)$_2$]$_2$(Me)Si(CH$_2$)$_3$Hal,
[(C$_9$H$_{19}$O—(CH$_2$—CH$_2$O)$_3$]$_2$(Me)Si(CH$_2$)$_3$Hal,
[(C$_9$H$_{19}$O—(CH$_2$—CH$_2$O)$_4$]$_2$(Me)Si(CH$_2$)$_3$Hal,
[(C$_9$H$_{19}$O—(CH$_2$—CH$_2$O)$_5$]$_2$(Me)Si(CH$_2$)$_3$Hal,
[(C$_9$H$_{19}$O—(CH$_2$—CH$_2$O)$_6$]$_2$(Me)Si(CH$_2$)$_3$Hal,
[(C$_7$H$_{15}$O—(CH$_2$—CH$_2$O)$_2$](Me)(EtO)Si(CH$_2$)$_3$Hal,
[(C$_7$H$_{15}$O—(CH$_2$—CH$_2$O)$_3$](Me)(EtO)Si(CH$_2$)$_3$Hal,
[(C$_7$H$_{15}$O—(CH$_2$—CH$_2$O)$_4$](Me)(EtO)Si(CH$_2$)$_3$Hal,
[(C$_7$H$_{15}$O—(CH$_2$—CH$_2$O)$_5$](Me)(EtO)Si(CH$_2$)$_3$Hal,
[(C$_7$H$_{15}$O—(CH$_2$—CH$_2$O)$_6$](Me)(EtO)Si(CH$_2$)$_3$Hal,
[(C$_8$H$_{17}$O—(CH$_2$—CH$_2$O)$_2$](Me)(EtO)Si(CH$_2$)$_3$Hal,
[(C$_8$H$_{17}$O—(CH$_2$—CH$_2$O)$_3$](Me)(EtO)Si(CH$_2$)$_3$Hal,
[(C$_8$H$_{17}$O—(CH$_2$—CH$_2$O)$_4$](Me)(EtO)Si(CH$_2$)$_3$Hal,
[(C$_8$H$_{17}$O—(CH$_2$—CH$_2$O)$_5$](Me)(EtO)Si(CH$_2$)$_3$Hal,
[(C$_8$H$_{17}$O—(CH$_2$—CH$_2$O)$_6$](Me)(EtO)Si(CH$_2$)$_3$Hal,
[(C$_9$H$_{19}$O—(CH$_2$—CH$_2$O)$_2$](Me)(EtO)Si(CH$_2$)$_3$Hal,
[(C$_9$H$_{19}$O—(CH$_2$—CH$_2$O)$_3$](Me)(EtO)Si(CH$_2$)$_3$Hal,
[(C$_9$H$_{19}$O—(CH$_2$—CH$_2$O)$_4$](Me)(EtO)Si(CH$_2$)$_3$Hal,
[(C$_9$H$_{19}$O—(CH$_2$—CH$_2$O)$_5$](Me)(EtO)Si(CH$_2$)$_3$Hal,
[(C$_9$H$_{19}$O—(CH$_2$—CH$_2$O)$_6$](Me)(EtO)Si(CH$_2$)$_3$Hal,
[(C$_{10}$H$_{21}$O—(CH$_2$—CH$_2$O)$_2$](Me)(EtO)Si(CH$_2$)$_3$Hal,
[(C$_{10}$H$_{21}$O—(CH$_2$—CH$_2$O)$_3$](Me)(EtO)Si(CH$_2$)$_3$Hal,
[(C$_{10}$H$_{21}$O—(CH$_2$—CH$_2$O)$_4$](Me)(EtO)Si(CH$_2$)$_3$Hal,
[(C$_{10}$H$_{21}$O—(CH$_2$—CH$_2$O)$_5$](Me)(EtO)Si(CH$_2$)$_3$Hal,
[(C$_{10}$H$_{21}$O—(CH$_2$—CH$_2$O)$_6$](Me)(EtO)Si(CH$_2$)$_3$Hal,
[(C$_{11}$H$_{23}$O—(CH$_2$—CH$_2$O)$_2$](Me)(EtO)Si(CH$_2$)$_3$Hal,
[(C$_{11}$H$_{23}$O—(CH$_2$—CH$_2$O)$_3$](Me)(EtO)Si(CH$_2$)$_3$Hal,
[(C$_{11}$H$_{23}$O—(CH$_2$—CH$_2$O)$_4$](Me)(EtO)Si(CH$_2$)$_3$Hal,
[(C$_{11}$H$_{23}$O—(CH$_2$—CH$_2$O)$_5$](Me)(EtO)Si(CH$_2$)$_3$Hal,
[(C$_{11}$H$_{23}$O—(CH$_2$—CH$_2$O)$_6$](Me)(EtO)Si(CH$_2$)$_3$Hal,
[(C$_{12}$H$_{25}$O—(CH$_2$—CH$_2$O)$_2$](Me)(EtO)Si(CH$_2$)$_3$Hal,
[(C$_{12}$H$_{25}$O—(CH$_2$—CH$_2$O)$_3$](Me)(EtO)Si(CH$_2$)$_3$Hal,
[(C$_{12}$H$_{25}$O—(CH$_2$—CH$_2$O)$_4$](Me)(EtO)Si(CH$_2$)$_3$Hal,
[(C$_{12}$H$_{25}$O—(CH$_2$—CH$_2$O)$_5$](Me)(EtO)Si(CH$_2$)$_3$Hal,
[(C$_{12}$H$_{25}$O—(CH$_2$—CH$_2$O)$_6$](Me)(EtO)Si(CH$_2$)$_3$Hal,
[(C$_{13}$H$_{27}$O—(CH$_2$—CH$_2$O)$_2$](Me)(EtO)Si(CH$_2$)$_3$Hal,
[(C$_{13}$H$_{27}$O—(CH$_2$—CH$_2$O)$_3$](Me)(EtO)Si(CH$_2$)$_3$Hal,
[(C$_{13}$H$_{27}$O—(CH$_2$—CH$_2$O)$_4$](Me)(EtO)Si(CH$_2$)$_3$Hal,
[(C$_{13}$H$_{27}$O—(CH$_2$—CH$_2$O)$_5$](Me)(EtO)Si(CH$_2$)$_3$Hal,
[(C$_{13}$H$_{27}$O—(CH$_2$—CH$_2$O)$_6$](Me)(EtO)Si(CH$_2$)$_3$Hal,
[(C$_{14}$H$_{29}$O—(CH$_2$—CH$_2$O)$_2$](Me)(EtO)Si(CH$_2$)$_3$Hal,
[(C$_{14}$H$_{29}$O—(CH$_2$—CH$_2$O)$_3$](Me)(EtO)Si(CH$_2$)$_3$Hal,
[(C$_{14}$H$_{29}$O—(CH$_2$—CH$_2$O)$_4$](Me)(EtO)Si(CH$_2$)$_3$Hal,
[(C$_{14}$H$_{29}$O—(CH$_2$—CH$_2$O)$_5$](Me)(EtO)Si(CH$_2$)$_3$Hal,
[(C$_{14}$H$_{29}$O—(CH$_2$—CH$_2$O)$_6$](Me)(EtO)Si(CH$_2$)$_3$Hal,
[(C$_{15}$H$_{31}$O—(CH$_2$—CH$_2$O)$_2$](Me)(EtO)Si(CH$_2$)$_3$Hal,
[(C$_{15}$H$_{31}$O—(CH$_2$—CH$_2$O)$_3$](Me)(EtO)Si(CH$_2$)$_3$Hal,
[(C$_{15}$H$_{31}$O—(CH$_2$—CH$_2$O)$_4$](Me)(EtO)Si(CH$_2$)$_3$Hal,
[(C$_{15}$H$_{31}$O—(CH$_2$—CH$_2$O)$_5$](Me)(EtO)Si(CH$_2$)$_3$Hal,
[(C$_{15}$H$_{31}$O—(CH$_2$—CH$_2$O)$_6$](Me)(EtO)Si(CH$_2$)$_3$Hal,
[(C$_{16}$H$_{33}$O—(CH$_2$—CH$_2$O)$_2$](Me)(EtO)Si(CH$_2$)$_3$Hal,
[(C$_{16}$H$_{33}$O—(CH$_2$—CH$_2$O)$_3$](Me)(EtO)Si(CH$_2$)$_3$Hal,
[(C$_{16}$H$_{33}$O—(CH$_2$—CH$_2$O)$_4$](Me)(EtO)Si(CH$_2$)$_3$Hal,
[(C$_{16}$H$_{33}$O—(CH$_2$—CH$_2$O)$_5$](Me)(EtO)Si(CH$_2$)$_3$Hal,
[(C$_{16}$H$_{33}$O—(CH$_2$—CH$_2$O)$_6$](Me)(EtO)Si(CH$_2$)$_3$Hal,
[(C$_{17}$H$_{35}$O—(CH$_2$—CH$_2$O)$_2$](Me)(EtO)Si(CH$_2$)$_3$Hal,
[(C$_{17}$H$_{35}$O—(CH$_2$—CH$_2$O)$_3$](Me)(EtO)Si(CH$_2$)$_3$Hal,
[(C$_{17}$H$_{35}$O—(CH$_2$—CH$_2$O)$_4$](Me)(EtO)Si(CH$_2$)$_3$Hal,
[(C$_{17}$H$_{35}$O—(CH$_2$—CH$_2$O)$_5$](Me)(EtO)Si(CH$_2$)$_3$Hal,
[(C$_{17}$H$_{35}$O—(CH$_2$—CH$_2$O)$_6$](Me)(EtO)Si(CH$_2$)$_3$Hal,

[(C₁₈H₃₇O—(CH₂—CH₂O)₂](Me)(EtO)Si(CH₂)₃Hal,
[(C₁₈H₃₇O—(CH₂—CH₂O)₃](Me)(EtO)Si(CH₂)₃Hal,
[(C₁₈H₃₇O—(CH₂—CH₂O)₄](Me)(EtO)Si(CH₂)₃Hal,
[(C₁₈H₃₇O—(CH₂—CH₂O)₅](Me)(EtO)Si(CH₂)₃Hal,
[(C₁₈H₃₇O—(CH₂—CH₂O)₆](Me)(EtO)Si(CH₂)₃Hal,
[(C₇H₁₅O—(CH₂—CH₂O)₂](Me)(MeO)Si(CH₂)₃Hal,
[(C₇H₁₅O—(CH₂—CH₂O)₃](Me)(MeO)Si(CH₂)₃Hal,
[(C₇H₁₅O—(CH₂—CH₂O)₄](Me)(MeO)Si(CH₂)₃Hal,
[(C₇H₁₅O—(CH₂—CH₂O)₅](Me)(MeO)Si(CH₂)₃Hal,
[(C₇H₁₅O—(CH₂—CH₂O)₆](Me)(MeO)Si(CH₂)₃Hal,
[(C₈H₁₇O—(CH₂—CH₂O)₂](Me)(MeO)Si(CH₂)₃Hal,
[(C₈H₁₇O—(CH₂—CH₂O)₃](Me)(MeO)Si(CH₂)₃Hal,
[(C₈H₁₇O—(CH₂—CH₂O)₄](Me)(MeO)Si(CH₂)₃Hal,
[(C₈H₁₇O—(CH₂—CH₂O)₅](Me)(MeO)Si(CH₂)₃Hal,
[(C₈H₁₇O—(CH₂—CH₂O)₆](Me)(MeO)Si(CH₂)₃Hal,
[(C₉H₁₉O—(CH₂—CH₂O)₂](Me)(MeO)Si(CH₂)₃Hal,
[(C₉H₁₉O—(CH₂—CH₂O)₃](Me)(MeO)Si(CH₂)₃Hal,
[(C₉H₁₉O—(CH₂—CH₂O)₄](Me)(MeO)Si(CH₂)₃Hal,
[(C₉H₁₉O—(CH₂—CH₂O)₅](Me)(MeO)Si(CH₂)₃Hal,
[(C₉H₁₉O—(CH₂—CH₂O)₆](Me)(MeO)Si(CH₂)₃Hal,
[(C₇H₁₅O—(CH₂—CH₂O)₂](MeO)₂Si(CH₂)₃Hal,
[(C₇H₁₅O—(CH₂—CH₂O)₃](MeO)₂Si(CH₂)₃Hal,
[(C₇H₁₅O—(CH₂—CH₂O)₄](MeO)₂Si(CH₂)₃Hal,
[(C₇H₁₅O—(CH₂—CH₂O)₅](MeO)₂Si(CH₂)₃Hal,
[(C₇H₁₅O—(CH₂—CH₂O)₆](MeO)₂Si(CH₂)₃Hal,
[(C₈H₁₇O—(CH₂—CH₂O)₂](MeO)₂Si(CH₂)₃Hal,
[(C₈H₁₇O—(CH₂—CH₂O)₃](MeO)₂Si(CH₂)₃Hal,
[(C₈H₁₇O—(CH₂—CH₂O)₄](MeO)₂Si(CH₂)₃Hal,
[(C₈H₁₇O—(CH₂—CH₂O)₅](MeO)₂Si(CH₂)₃Hal,
[(C₈H₁₇O—(CH₂—CH₂O)₆](MeO)₂Si(CH₂)₃Hal,
[(C₉H₁₉O—(CH₂—CH₂O)₂](MeO)₂Si(CH₂)₃Hal,
[(C₉H₁₉O—(CH₂—CH₂O)₃](MeO)₂Si(CH₂)₃Hal,
[(C₉H₁₉O—(CH₂—CH₂O)₄](MeO)₂Si(CH₂)₃Hal,
[(C₉H₁₉O—(CH₂—CH₂O)₅](MeO)₂Si(CH₂)₃Hal,
[(C₉H₁₉O—(CH₂—CH₂O)₆](MeO)₂Si(CH₂)₃Hal,
[(C₁₀H₂₁O—(CH₂—CH₂O)₂](MeO)₂Si(CH₂)₃Hal,
[(C₁₀H₂₁O—(CH₂—CH₂O)₃](MeO)₂Si(CH₂)₃Hal,
[(C₁₀H₂₁O—(CH₂—CH₂O)₄](MeO)₂Si(CH₂)₃Hal,
[(C₁₀H₂₁O—(CH₂—CH₂O)₅](MeO)₂Si(CH₂)₃Hal,
[(C₁₀H₂₁O—(CH₂—CH₂O)₆](MeO)₂Si(CH₂)₃Hal,
[(C₁₁H₂₃O—(CH₂—CH₂O)₂](MeO)₂Si(CH₂)₃Hal,
[(C₁₁H₂₃O—(CH₂—CH₂O)₃](MeO)₂Si(CH₂)₃Hal,
[(C₁₁H₂₃O—(CH₂—CH₂O)₄](MeO)₂Si(CH₂)₃Hal,
[(C₁₁H₂₃O—(CH₂—CH₂O)₅](MeO)₂Si(CH₂)₃Hal,
[(C₁₁H₂₃O—(CH₂—CH₂O)₆](MeO)₂Si(CH₂)₃Hal,
[(C₁₂H₂₅O—(CH₂—CH₂O)₂](MeO)₂Si(CH₂)₃Hal,
[(C₁₂H₂₅O—(CH₂—CH₂O)₃](MeO)₂Si(CH₂)₃Hal,
[(C₁₂H₂₅O—(CH₂—CH₂O)₄](MeO)₂Si(CH₂)₃Hal,
[(C₁₂H₂₅O—(CH₂—CH₂O)₅](MeO)₂Si(CH₂)₃Hal,
[(C₁₂H₂₅O—(CH₂—CH₂O)₆](MeO)₂Si(CH₂)₃Hal,
[(C₁₃H₂₇O—(CH₂—CH₂O)₂](MeO)₂Si(CH₂)₃Hal,
[(C₁₃H₂₇O—(CH₂—CH₂O)₃](MeO)₂Si(CH₂)₃Hal,
[(C₁₃H₂₇O—(CH₂—CH₂O)₄](MeO)₂Si(CH₂)₃Hal,
[(C₁₃H₂₇O—(CH₂—CH₂O)₅](MeO)₂Si(CH₂)₃Hal,
[(C₁₃H₂₇O—(CH₂—CH₂O)₆](MeO)₂Si(CH₂)₃Hal,
[(C₁₄H₂₉O—(CH₂—CH₂O)₂](MeO)₂Si(CH₂)₃Hal,
[(C₁₄H₂₉O—(CH₂—CH₂O)₃](MeO)₂Si(CH₂)₃Hal,
[(C₁₄H₂₉O—(CH₂—CH₂O)₄](MeO)₂Si(CH₂)₃Hal,
[(C₁₄H₂₉O—(CH₂—CH₂O)₅](MeO)₂Si(CH₂)₃Hal,
[(C₁₄H₂₉O—(CH₂—CH₂O)₆](MeO)₂Si(CH₂)₃Hal,
[(C₁₆H₃₃O—(CH₂—CH₂O)₂](MeO)₂Si(CH₂)₃Hal,
[(C₁₆H₃₃O—(CH₂—CH₂O)₃](MeO)₂Si(CH₂)₃Hal,
[(C₁₆H₃₃O—(CH₂—CH₂O)₄](MeO)₂Si(CH₂)₃Hal,
[(C₁₆H₃₃O—(CH₂—CH₂O)₅](MeO)₂Si(CH₂)₃Hal,
[(C₁₆H₃₃O—(CH₂—CH₂O)₆](MeO)₂Si(CH₂)₃Hal,
[(C₁₈H₃₇O—(CH₂—CH₂O)₂](MeO)₂Si(CH₂)₃Hal,
[(C₁₈H₃₇O—(CH₂—CH₂O)₃](MeO)₂Si(CH₂)₃Hal,
[(C₁₈H₃₇O—(CH₂—CH₂O)₄](MeO)₂Si(CH₂)₃Hal,
[(C₁₈H₃₇O—(CH₂—CH₂O)₅](MeO)₂Si(CH₂)₃Hal,
[(C₁₈H₃₇O—(CH₂—CH₂O)₆](MeO)₂Si(CH₂)₃Hal,
[(C₉H₁₉O—(CH₂—CH₂O)₂]₂(MeO)Si(CH₂)₃Hal,
[(C₉H₁₉O—(CH₂—CH₂O)₃]₂(MeO)Si(CH₂)₃Hal,
[(C₉H₁₉O—(CH₂—CH₂O)₄]₂(MeO)Si(CH₂)₃Hal,
[(C₉H₁₉O—(CH₂—CH₂O)₅]₂(MeO)Si(CH₂)₃Hal,
[(C₉H₁₉O—(CH₂—CH₂O)₆]₂(MeO)Si(CH₂)₃Hal,
[(C₁₂H₂₅O—(CH₂—CH₂O)₂]₂(MeO)Si(CH₂)₃Hal,
[(C₁₂H₂₅O—(CH₂—CH₂O)₃]₂(MeO)Si(CH₂)₃Hal,
[(C₁₂H₂₅O—(CH₂—CH₂O)₄]₂(MeO)Si(CH₂)₃Hal,
[(C₁₂H₂₅O—(CH₂—CH₂O)₅]₂(MeO)Si(CH₂)₃Hal,
[(C₁₂H₂₅O—(CH₂—CH₂O)₆]₂(MeO)Si(CH₂)₃Hal,
[(C₁₃H₂₇O—(CH₂—CH₂O)₂]₂(MeO)Si(CH₂)₃Hal,
[(C₁₃H₂₇O—(CH₂—CH₂O)₃]₂(MeO)Si(CH₂)₃Hal,
[(C₁₃H₂₇O—(CH₂—CH₂O)₄]₂(MeO)Si(CH₂)₃Hal,
[(C₁₃H₂₇O—(CH₂—CH₂O)₅]₂(MeO)Si(CH₂)₃Hal,
[(C₁₃H₂₇O—(CH₂—CH₂O)₆]₂(MeO)Si(CH₂)₃Hal,
[(C₁₄H₂₉O—(CH₂—CH₂O)₂]₂(MeO)Si(CH₂)₃Hal,
[(C₁₄H₂₉O—(CH₂—CH₂O)₃]₂(MeO)Si(CH₂)₃Hal,
[(C₁₄H₂₉O—(CH₂—CH₂O)₄]₂(MeO)Si(CH₂)₃Hal,
[(C₁₄H₂₉O—(CH₂—CH₂O)₅]₂(MeO)Si(CH₂)₃Hal,
[(C₁₄H₂₉O—(CH₂—CH₂O)₆]₂(MeO)Si(CH₂)₃Hal,
[(C₁₆H₃₃O—(CH₂—CH₂O)₂]₂(MeO)Si(CH₂)₃Hal,
[(C₁₆H₃₃O—(CH₂—CH₂O)₃]₂(MeO)Si(CH₂)₃Hal,
[(C₁₆H₃₃O—(CH₂—CH₂O)₄]₂(MeO)Si(CH₂)₃Hal,
[(C₁₆H₃₃O—(CH₂—CH₂O)₅]₂(MeO)Si(CH₂)₃Hal,
[(C₁₆H₃₃O—(CH₂—CH₂O)₆]₂(MeO)Si(CH₂)₃Hal,
[(C₁₈H₃₇O—(CH₂—CH₂O)₂]₂(MeO)Si(CH₂)₃Hal,
[(C₁₈H₃₇O—(CH₂—CH₂O)₃]₂(MeO)Si(CH₂)₃Hal,
[(C₁₈H₃₇O—(CH₂—CH₂O)₄]₂(MeO)Si(CH₂)₃Hal,
[(C₁₈H₃₇O—(CH₂—CH₂O)₅]₂(MeO)Si(CH₂)₃Hal,
[(C₁₈H₃₇O—(CH₂—CH₂O)₆]₂(MeO)Si(CH₂)₃Hal,
[(C₇H₁₅O—(CH₂—CH₂O)₂](EtO)₂Si(CH₂)₃Hal,
[(C₇H₁₅O—(CH₂—CH₂O)₃](EtO)₂Si(CH₂)₃Hal,
[(C₇H₁₅O—(CH₂—CH₂O)₄](EtO)₂Si(CH₂₃Hal,
[(C₇H₁₅O—(CH₂—CH₂O)₅](EtO)₂Si(CH₂)₃Hal,
[(C₇H₁₅O—(CH₂—CH₂O)₆](EtO)₂Si(CH₂)₃Hal,
[(C₈H₁₇O—(CH₂—CH₂O)₂](EtO)₂Si(CH₂)₃Hal,
[(C₈H₁₇O—(CH₂—CH₂O)₃](EtO)₂Si(CH₂)₃Hal,
[(C₈H₁₇O—(CH₂—CH₂O)₄](EtO)₂Si(CH₂)₃Hal,
[(C₈H₁₇O—(CH₂—CH₂O)₅](EtO)₂Si(CH₂)₃Hal,
[(C₈H₁₇O—(CH₂—CH₂O)₆](EtO)₂Si(CH₂)₃Hal,
[(C₉H₁₉O—(CH₂—CH₂O)₂](EtO)₂Si(CH₂)₃Hal,
[(C₉H₁₉O—(CH₂—CH₂O)₃](EtO)₂Si(CH₂)₃Hal,
[(C₉H₁₉O—(CH₂—CH₂O)₄](EtO)₂Si(CH₂)₃Hal,
[(C₉H₁₉O—(CH₂—CH₂O)₅](EtO)₂Si(CH₂)₃Hal,
[(C₉H₁₉O—(CH₂—CH₂O)₆](EtO)₂Si(CH₂)₃Hal,
[(C₁₀H₂₁O—(CH₂—CH₂O)₂](EtO)₂Si(CH₂)₃Hal,
[(C₁₀H₂₁O—(CH₂—CH₂O)₃](EtO)₂Si(CH₂)₃Hal,
[(C₁₀H₂₁O—(CH₂—CH₂O)₄](EtO)₂Si(CH₂)₃Hal,
[(C₁₀H₂₁O—(CH₂—CH₂O)₅](EtO)₂Si(CH₂)₃Hal,
[(C₁₀H₂₁O—(CH₂—CH₂O)₆](EtO)₂Si(CH₂)₃Hal,
[(C₁₁H₂₃O—(CH₂—CH₂O)₂](EtO)₂Si(CH₂)₃Hal,
[(C₁₁H₂₃O—(CH₂—CH₂O)₃](EtO)₂Si(CH₂)₃Hal,
[(C₁₁H₂₃O—(CH₂—CH₂O)₄](EtO)₂Si(CH₂)₃Hal,
[(C₁₁H₂₃O—(CH₂—CH₂O)₅](EtO)₂Si(CH₂)₃Hal,
[(C₁₁H₂₃O—(CH₂—CH₂O)₆](EtO)₂Si(CH₂)₃Hal,
[(C₁₂H₂₅O—(CH₂—CH₂O)₂](EtO)₂Si(CH₂)₃Hal,
[(C₁₂H₂₅O—(CH₂—CH₂O)₃](EtO)₂Si(CH₂)₃Hal,
[(C₁₂H₂₅O—(CH₂—CH₂O)₄](EtO)₂Si(CH₂)₃Hal,
[(C₁₂H₂₅O—(CH₂—CH₂O)₅](EtO)₂Si(CH₂)₃Hal,
[(C₁₂H₂₅O—(CH₂—CH₂O)₆](EtO)₂Si(CH₂)₃Hal,
[(C₁₃H₂₇O—(CH₂—CH₂O)₂](EtO)₂Si(CH₂)₃Hal,
[(C₁₃H₂₇O—(CH₂—CH₂O)₃](EtO)₂Si(CH₂)₃Hal,
[(C₁₃H₂₇O—(CH₂—CH₂O)₄](EtO)₂Si(CH₂)₃Hal,

[(C₁₃H₂₇O—(CH₂—CH₂O)₅](EtO)₂Si(CH₂)₃Hal,
[(C₁₃H₂₇O—(CH₂—CH₂O)₆](EtO)₂Si(CH₂)₃Hal,
[(C₁₄H₂₉O—(CH₂—CH₂O)₂](EtO)₂Si(CH₂)₃Hal,
[(C₁₄H₂₉O—(CH₂—CH₂O)₃](EtO)₂Si(CH₂)₃Hal,
[(C₁₄H₂₉O—(CH₂—CH₂O)₄](EtO)₂Si(CH₂)₃Hal,
[(C₁₄H₂₉O—(CH₂—CH₂O)₅](EtO)₂Si(CH₂)₃Hal,
[(C₁₄H₂₉O—(CH₂—CH₂O)₆](EtO)₂Si(CH₂)₃Hal,
[(C₁₆H₃₃O—(CH₂—CH₂O)₂](EtO)₂Si(CH₂)₃Hal,
[(C₁₆H₃₃O—(CH₂—CH₂O)₃](EtO)₂Si(CH₂)₃Hal,
[(C₁₆H₃₃O—(CH₂—CH₂O)₄](EtO)₂Si(CH₂)₃Hal,
[(C₁₆H₃₃O—(CH₂—CH₂O)₅](EtO)₂Si(CH₂)₃Hal,
[(C₁₆H₃₃O—(CH₂—CH₂O)₆](EtO)₂Si(CH₂)₃Hal,
[(C₁₇H₃₅O—(CH₂—CH₂O)₂](EtO)₂Si(CH₂)₃Hal,
[(C₁₇H₃₅O—(CH₂—CH₂O)₃](EtO)₂Si(CH₂)₃Hal,
[(C₁₇H₃₅O—(CH₂—CH₂O)₄](EtO)₂Si(CH₂)₃Hal,
[(C₁₇H₃₅O—(CH₂—CH₂O)₅](EtO)₂Si(CH₂)₃Hal,
[(C₁₇H₃₅O—(CH₂—CH₂O)₆](EtO)₂Si(CH₂)₃Hal,
[(C₁₈H₃₇O—(CH₂—CH₂O)₂](EtO)₂Si(CH₂)₃Hal,
[(C₁₈H₃₇O—(CH₂—CH₂O)₃](EtO)₂Si(CH₂)₃Hal,
[(C₁₈H₃₇O—(CH₂—CH₂O)₄](EtO)₂Si(CH₂)₃Hal,
[(C₁₈H₃₇O—(CH₂—CH₂O)₅](EtO)₂Si(CH₂)₃Hal,
[(C₁₈H₃₇O—(CH₂—CH₂O)₆](EtO)₂Si(CH₂)₃Hal,
[(C₇H₁₅O—(CH₂—CH₂O)₂]₂(EtO)Si(CH₂)₃Hal,
[(C₇H₁₅O—(CH₂—CH₂O)₃]₂(EtO)Si(CH₂)₃Hal,
[(C₇H₁₅O—(CH₂—CH₂O)₄]₂(EtO)Si(CH₂)₃Hal,
[(C₇H₁₅O—(CH₂—CH₂O)₅]₂(EtO)Si(CH₂)₃Hal,
[(C₇H₁₅O—(CH₂—CH₂O)₆]₂(EtO)Si(CH₂)₃Hal,
[(C₈H₁₇O—(CH₂—CH₂O)₂]₂(EtO)Si(CH₂)₃Hal,
[(C₈H₁₇O—(CH₂—CH₂O)₃]₂(EtO)Si(CH₂)₃Hal,
[(C₈H₁₇O—(CH₂—CH₂O)₄]₂(EtO)Si(CH₂)₃Hal,
[(C₈H₁₇O—(CH₂—CH₂O)₅]₂(EtO)Si(CH₂)₃Hal,
[(C₈H₁₇O—(CH₂—CH₂O)₆]₂(EtO)Si(CH₂)₃Hal,
[(C₉H₁₉O—(CH₂—CH₂O)₂]₂(EtO)Si(CH₂)₃Hal,
[(C₉H₁₉O—(CH₂—CH₂O)₃]₂(EtO)Si(CH₂)₃Hal,
[(C₉H₁₉O—(CH₂—CH₂O)₄]₂(EtO)Si(CH₂)₃Hal,
[(C₉H₁₉O—(CH₂—CH₂O)₅]₂(EtO)Si(CH₂)₃Hal,
[(C₉H₁₉O—(CH₂—CH₂O)₆]₂(EtO)Si(CH₂)₃Hal,
[(C₁₂H₂₅O—(CH₂—CH₂O)₂]₂(EtO)Si(CH₂)₃Hal,
[(C₁₂H₂₅O—(CH₂—CH₂O)₃]₂(EtO)Si(CH₂)₃Hal,
[(C₁₂H₂₅O—(CH₂—CH₂O)₄]₂(EtO)Si(CH₂)₃Hal,
[(C₁₂H₂₅O—(CH₂—CH₂O)₅]₂(EtO)Si(CH₂)₃Hal,
[(C₁₂H₂₅O—(CH₂—CH₂O)₆]₂(EtO)Si(CH₂)₃Hal,
[(C₁₃H₂₇O—(CH₂—CH₂O)₂]₂(EtO)Si(CH₂)₃Hal,
[(C₁₃H₂₇O—(CH₂—CH₂O)₃]₂(EtO)Si(CH₂)₃Hal,
[(C₁₃H₂₇O—(CH₂—CH₂O)₄]₂(EtO)Si(CH₂)₃Hal,
[(C₁₃H₂₇O—(CH₂—CH₂O)₅]₂(EtO)Si(CH₂)₃Hal,
[(C₁₃H₂₇O—(CH₂—CH₂O)₆]₂(EtO)Si(CH₂)₃Hal,
[(C₁₄H₂₉O—(CH₂—CH₂O)₂]₂(EtO)Si(CH₂)₃Hal,
[(C₁₄H₂₉O—(CH₂—CH₂O)₃]₂(EtO)Si(CH₂)₃Hal,
[(C₁₄H₂₉O—(CH₂—CH₂O)₄]₂(EtO)Si(CH₂)₃Hal,
[(C₁₄H₂₉O—(CH₂—CH₂O)₅]₂(EtO)Si(CH₂)₃Hal,
[(C₁₄H₂₉O—(CH₂—CH₂O)₆]₂(EtO)Si(CH₂)₃Hal,
[(C₁₆H₃₃O—(CH₂—CH₂O)₂]₂(EtO)Si(CH₂)₃Hal,
[(C₁₆H₃₃O—(CH₂—CH₂O)₃]₂(EtO)Si(CH₂)₃Hal,
[(C₁₆H₃₃O—(CH₂—CH₂O)₄]₂(EtO)Si(CH₂)₃Hal,
[(C₁₆H₃₃O—(CH₂—CH₂O)₅]₂(EtO)Si(CH₂)₃Hal,
[(C₁₆H₃₃O—(CH₂—CH₂O)₆]₂(EtO)Si(CH₂)₃Hal,
[(C₁₇H₃₅O—(CH₂—CH₂O)₂]₂(EtO)Si(CH₂)₃Hal,
[(C₁₇H₃₅O—(CH₂—CH₂O)₃]₂(EtO)Si(CH₂)₃Hal,
[(C₁₇H₃₅O—(CH₂—CH₂O)₄]₂(EtO)Si(CH₂)₃Hal,
[(C₁₇H₃₅O—(CH₂—CH₂O)₅]₂(EtO)Si(CH₂)₃Hal,
[(C₁₇H₃₅O—(CH₂—CH₂O)₆]₂(EtO)Si(CH₂)₃Hal,
[(C₁₈H₃₇O—(CH₂—CH₂O)₂]₂(EtO)Si(CH₂)₃Hal,
[(C₁₈H₃₇O—(CH₂—CH₂O)₃]₂(EtO)Si(CH₂)₃Hal,
[(C₁₈H₃₇O—(CH₂—CH₂O)₄]₂(EtO)Si(CH₂)₃Hal,
[(C₁₈H₃₇O—(CH₂—CH₂O)₅]₂(EtO)Si(CH₂)₃Hal,
[(C₁₈H₃₇O—(CH₂—CH₂O)₆]₂(EtO)Si(CH₂)₃Hal,

[(C₇H₁₅O—(CH₂—CH₂O)₂]₃Si(CH₂)₃Hal, [(C₇H₁₅O—(CH₂—CH₂O)₃]₃Si(CH₂)₃Hal, [(C₇H₁₅O—(CH₂—CH₂O)₄]₃Si(CH₂)₃Hal, [(C₇H₁₅O—(CH₂—CH₂O)₅]₃Si(CH₂)₃Hal, [(C₇H₁₅O—(CH₂—CH₂O)₆]₃Si(CH₂)₃Hal,
[(C₈H₁₇O—(CH₂—CH₂O)₂]₃Si(CH₂)₃Hal, [(C₈H₁₇O—(CH₂—CH₂O)₃]₃Si(CH₂)₃Hal, [(C₈H₁₇O—(CH₂—CH₂O)₄]₃Si(CH₂)₃Hal, [(C₈H₁₇O—(CH₂—CH₂O)₅]₃Si(CH₂)₃Hal, [(C₈H₁₇O—(CH₂—CH₂O)₆]₃Si(CH₂)₃Hal,
[(C₉H₁₉O—(CH₂—CH₂O)₂]₃Si(CH₂)₃Hal, [(C₉H₁₉O—(CH₂—CH₂O)₃]₃Si(CH₂)₃Hal, [(C₉H₁₉O—(CH₂—CH₂O)₄]₃Si(CH₂)₃Hal, [(C₉H₁₉O—(CH₂—CH₂O)₅]₃Si(CH₂)₃Hal, [(C₉H₁₉O—(CH₂—CH₂O)₆]₃Si(CH₂)₃Hal,
[(C₁₀H₂₁O—(CH₂—CH₂O)₂]₃Si(CH₂)₃Hal,
[(C₁₀H₂₁O—(CH₂—CH₂O)₃]₃Si(CH₂)₃Hal,
[(C₁₀H₂₁O—(CH₂—CH₂O)₄]₃Si(CH₂)₃Hal,
[(C₁₀H₂₁O—(CH₂—CH₂O)₅]₃Si(CH₂)₃Hal,
[(C₁₀H₂₁O—(CH₂—CH₂O)₆]₃Si(CH₂)₃Hal,
[(C₁₂H₂₅O—(CH₂—CH₂O)₂]₃Si(CH₂)₃Hal,
[(C₁₂H₂₅O—(CH₂—CH₂O)₃]₃Si(CH₂)₃Hal,
[(C₁₂H₂₅O—(CH₂—CH₂O)₄]₃Si(CH₂)₃Hal,
[(C₁₂H₂₅O—(CH₂—CH₂O)₅]₃Si(CH₂)₃Hal,
[(C₁₂H₂₅O—(CH₂—CH₂O)₆]₃Si(CH₂)₃Hal,
[(C₁₃H₂₇O—(CH₂—CH₂O)₂]₃Si(CH₂)₃Hal,
[(C₁₃H₂₇O—(CH₂—CH₂O)₃]₃Si(CH₂)₃Hal,
[(C₁₃H₂₇O—(CH₂—CH₂O)₄]₃Si(CH₂)₃Hal,
[(C₁₃H₂₇O—(CH₂—CH₂O)₅]₃Si(CH₂)₃Hal,
[(C₁₃H₂₇O—(CH₂—CH₂O)₆]₃Si(CH₂)₃Hal,
[(C₁₄H₂₉O—(CH₂—CH₂O)₂]₃Si(CH₂)₃Hal,
[(C₁₄H₂₉O—(CH₂—CH₂O)₃]₃Si(CH₂)₃Hal,
[(C₁₄H₂₉O—(CH₂—CH₂O)₄]₃Si(CH₂)₃Hal,
[(C₁₄H₂₉O—(CH₂—CH₂O)₅]₃Si(CH₂)₃Hal,
[(C₁₄H₂₉O—(CH₂—CH₂O)₆]₃Si(CH₂)₃Hal,
[(C₁₅H₃₁O—(CH₂—CH₂O)₂]₃Si(CH₂)₃Hal,
[(C₁₅H₃₁O—(CH₂—CH₂O)₃]₃Si(CH₂)₃Hal,
[(C₁₅H₃₁—(CH₂—CH₂O)₄]₃Si(CH₂)₃Hal,
[(C₁₅H₃₁O—(CH₂—CH₂O)₅]₃Si(CH₂)₃Hal,
[(C₁₅H₃₁O—(CH₂—CH₂O)₆]₃Si(CH₂)₃Hal,
[(C₁₆H₃₃O—(CH₂—CH₂O)₂]₃Si(CH₂)₃Hal,
[(C₁₆H₃₃O—(CH₂—CH₂O)₃]₃Si(CH₂)₃Hal,
[(C₁₆H₃₃O—(CH₂—CH₂O)₄]₃Si(CH₂)₃Hal,
[(C₁₆H₃₃O—(CH₂—CH₂O)₅]₃Si(CH₂)₃Hal,
[(C₁₆H₃₃O—(CH₂—CH₂O)₆]₃Si(CH₂)₃Hal,
[(C₁₈H₃₇O—(CH₂—CH₂O)₂]₃Si(CH₂)₃Hal,
[(C₁₈H₃₇O—(CH₂—CH₂O)₃]₃Si(CH₂)₃Hal,
[(C₁₈H₃₇O—(CH₂—CH₂O)₄]₃Si(CH₂)₃Hal,
[(C₁₈H₃₇O—(CH₂—CH₂O)₅]₃Si(CH₂)₃Hal, and
[(C₁₈H₃₇O—(CH₂—CH₂O)₆]₃Si(CH₂)₃Hal,
where the alkyl moieties (Alk) are unbranched or branched.

14. The rubber mixture of claim 13, wherein:
a) said oxidic filler is: an amorphous silica, a synthetic silicate, a synthetic or natural aluminum oxide or aluminum hydroxide, a natural silicate, a carbon black, or a synthetic or natural calcium carbonate; and
b) said rubber is a natural or synthetic rubber.

15. The rubber mixture of claim 1, wherein said (halo-organyl)alkylpolyethersilane is a mixture composed of (halo-organyl)alkylpolyethersilanes of the general formula I.

16. The rubber mixture of claim 1, wherein said (halo-organyl)alkylpolyethersilane has been absorbed onto an inert organic or inorganic carrier or has been prereacted with an organic or inorganic carrier.

17. The rubber mixture of claim 1, further comprising at least one additional silane.

18. The rubber mixture of claim 1, further comprising one or more of the following:
   a) a thiuram sulfide accelerator and/or carbamate accelerator, and/or the corresponding zinc salts,
   b) optionally, a nitrogen-containing coactivator,
   c) optionally, further rubber auxiliaries, and
   d) optionally, further accelerators.

19. A process for the production of the rubber mixture of claim 1, comprising mixing at least one rubber, at least one oxidic filler, and at least one (halo-organyl)alkylpolyethersilane of formula (I).

20. A product comprising the rubber mixture of claim 1, wherein said product is selected from the group consisting of: moldings; tires, cable sheathing, hoses, drive belts, conveyor belts, roll coverings, shoe soles, ring seals, and damping elements.

* * * * *